US012415375B2

(12) United States Patent
Eto

(10) Patent No.: US 12,415,375 B2
(45) Date of Patent: Sep. 16, 2025

(54) LIQUID DISCHARGE APPARATUS

(71) Applicant: Daiki Eto, Kanagawa (JP)

(72) Inventor: Daiki Eto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 109 days.

(21) Appl. No.: 18/366,412

(22) Filed: Aug. 7, 2023

(65) Prior Publication Data

US 2024/0100831 A1 Mar. 28, 2024

(30) Foreign Application Priority Data

Sep. 28, 2022 (JP) ................................ 2022-155224

(51) Int. Cl.
*B41J 2/01* (2006.01)
*B41J 2/06* (2006.01)
(Continued)

(52) U.S. Cl.
CPC ................ *B41J 29/13* (2013.01); *B41J 2/01* (2013.01); *B41J 2/06* (2013.01); *B41J 2/145* (2013.01); *B41J 3/28* (2013.01); *B41J 11/04* (2013.01); *B41J 13/0018* (2013.01); *B41J 13/0027* (2013.01); *B41J 29/02* (2013.01);
(Continued)

(58) Field of Classification Search
CPC ... B41J 2/0005; B41J 2/01; B41J 11/02; B41J 11/06; B41J 3/28; B41J 13/0009; B41J 13/0018; B41J 13/0027; B41J 29/02; B41J 29/12; B41J 29/13; B65H 5/04; B65H 2402/30; B65H 2402/32; B65H 2402/40; B65H 2402/44; B65H 2402/45; B65H 2402/46
See application file for complete search history.

(56) References Cited

U.S. PATENT DOCUMENTS 9,849,698 B2 12/2017 Obara
9,889,690 B2 2/2018 Hayashi
(Continued)

FOREIGN PATENT DOCUMENTS

CN 212148054 U * 12/2020
JP 2021-094721 A 6/2021
(Continued)

OTHER PUBLICATIONS

Extended European Search Report dated Jan. 29, 2024 for corresponding European Application No. 23190014.3.

*Primary Examiner* — Douglas X Rodriguez
*Assistant Examiner* — Kendrick X Liu
(74) *Attorney, Agent, or Firm* — Harness, Dickey & Pierce, P.L.C.

(57) ABSTRACT

A liquid discharge apparatus includes a liquid discharge head, a stage, a guide rail, and an opening-and-closing cover. The liquid discharge head discharges a liquid to a recording medium. The stage moves in a vertical direction to move the recording medium on the stage. The guide rail holds the stage. The stage is movable in a conveyance direction intersecting the vertical direction. The opening-and-closing cover is slidable in one of the conveyance direction and a main scanning direction intersecting both the conveyance direction and the vertical direction. The opening-and-closing cover includes a retraction portion retractable above the stage.

10 Claims, 17 Drawing Sheets

(51) Int. Cl.

| | |
|---|---|
| ***B41J 2/145*** | (2006.01) |
| ***B41J 3/28*** | (2006.01) |
| ***B41J 11/04*** | (2006.01) |
| ***B41J 11/06*** | (2006.01) |
| ***B41J 13/00*** | (2006.01) |
| ***B41J 29/02*** | (2006.01) |
| ***B41J 29/13*** | (2006.01) |
| ***B65H 5/04*** | (2006.01) |
| ***B65H 5/36*** | (2006.01) |

(52) U.S. Cl.

CPC ................ *B65H 5/04* (2013.01); *B65H 5/36* (2013.01); *B65H 2402/30* (2013.01); *B65H 2402/32* (2013.01); *B65H 2402/44* (2013.01); *B65H 2402/45* (2013.01); *B65H 2402/46* (2013.01)

(56) References Cited

U.S. PATENT DOCUMENTS

| | | | |
|---|---|---|---|
| 11,142,005 | B2 | 10/2021 | Kobayashi et al. |
| 2003/0202083 | A1 | 10/2003 | Deguchi |
| 2020/0369038 | A1 | 11/2020 | Miyazawa et al. |

FOREIGN PATENT DOCUMENTS

| | | | | |
|---|---|---|---|---|
| JP | 2021-138092 | A | | 9/2021 |
| JP | 2021138046 | A | * | 9/2021 |
| WO | 2020-202919 | A1 | | 10/2020 |

* cited by examiner

LIQUID DISCHARGE APPARATUS

CROSS-REFERENCE TO RELATED APPLICATION

This patent application is based on and claims priority pursuant to 35 U.S.C. § 119(a) to Japanese Patent Application No. 2022-155224, filed on Sep. 28, 2022, in the Japan Patent Office, the entire disclosure of which is hereby incorporated by reference herein.

BACKGROUND

Technical Field

Embodiments of the present disclosure relate to a liquid discharge apparatus.

Related Art

In the related art, a liquid discharge apparatus discharges ink as a liquid onto a recording medium to form an image on the recording medium. The liquid discharge apparatus may include an opening-and-closing member which is slidable to expose and cover an interior of the liquid discharge apparatus.

SUMMARY

Embodiments of the present disclosure describe an improved liquid discharge apparatus that includes a liquid discharge head, a stage, a guide rail, and an opening-and-closing cover. The liquid discharge head discharges a liquid to a recording medium. The stage moves in a vertical direction to move the recording medium on the stage. The guide rail holds the stage. The stage is movable in a conveyance direction intersecting the vertical direction. The opening-and-closing cover is slidable in one of the conveyance direction and a main scanning direction intersecting both the conveyance direction and the vertical direction. The opening-and-closing cover includes a retraction portion retractable above the stage.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
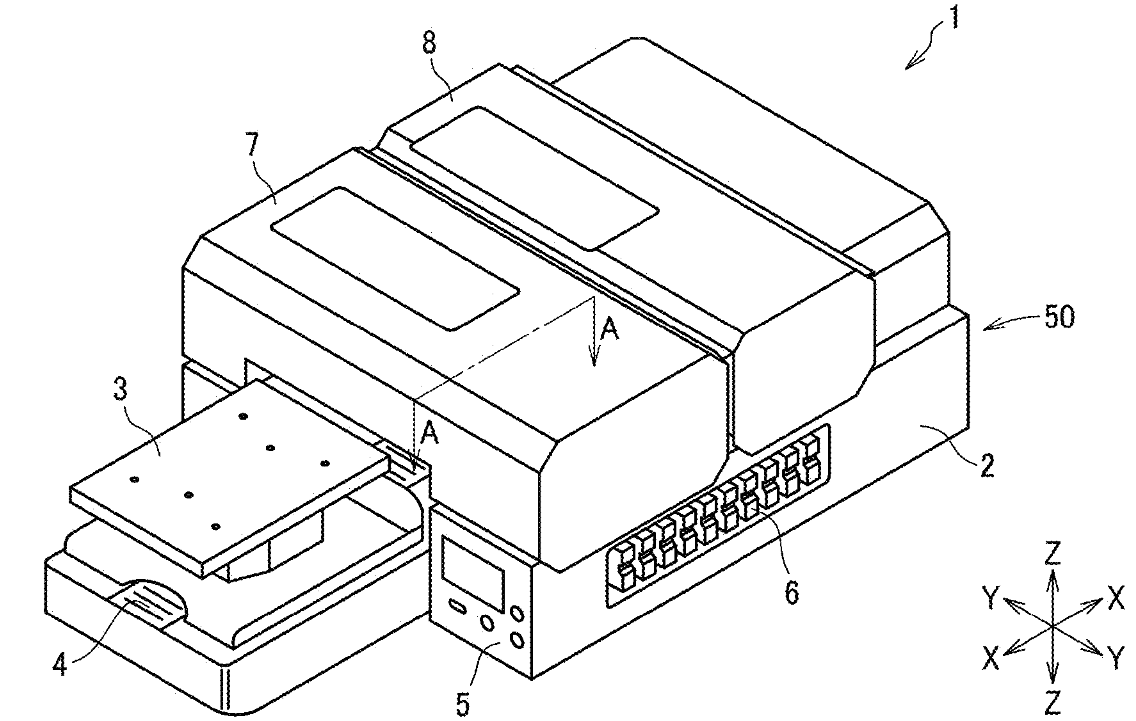
FIG. 1 is a perspective view of a liquid discharge apparatus according to an embodiment of the present disclosure, with covers closed.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings. In the drawings, like reference signs denote like elements, and overlapping description may be simplified or omitted as appropriate.

Figure 2:
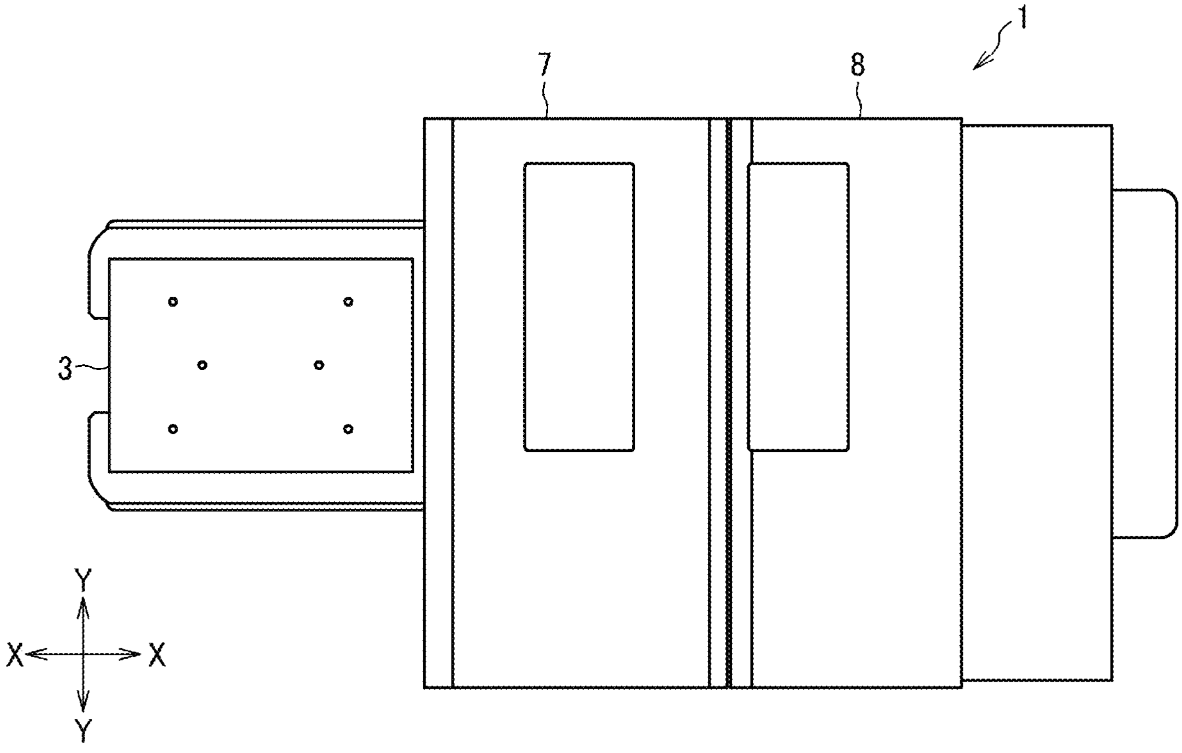
FIG. 2 is a plan view of the liquid discharge apparatus illustrated in FIG. 1.
Figure 3:
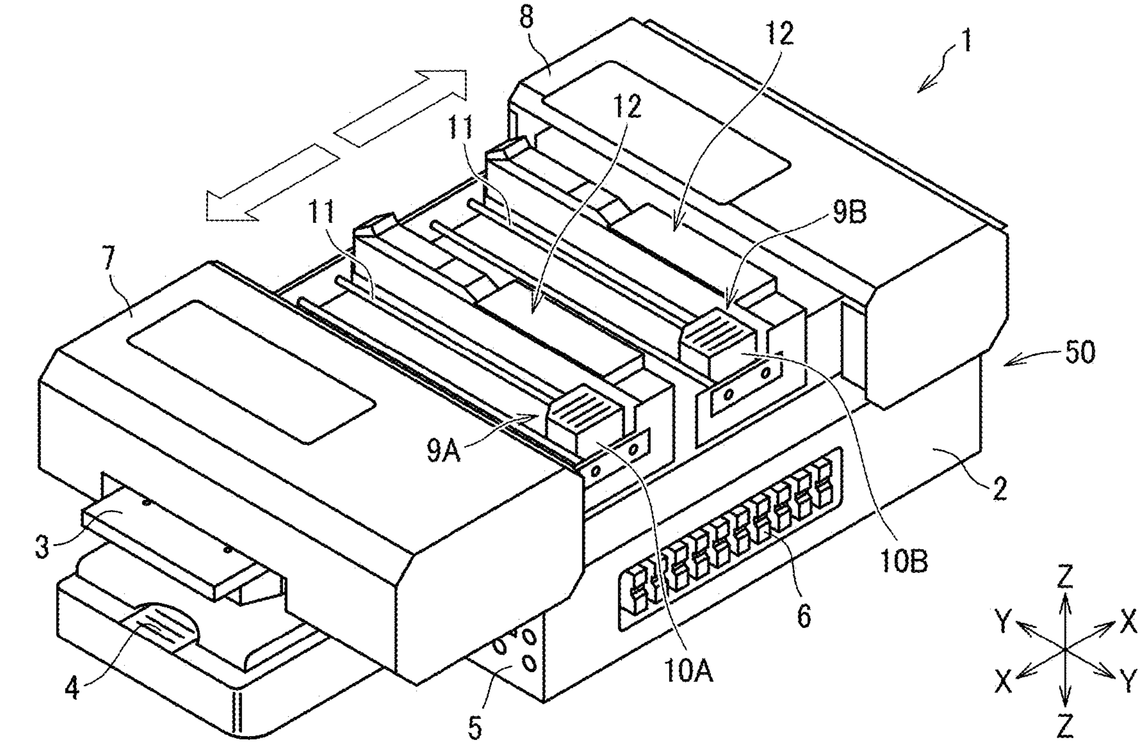
FIG. 3 is a perspective view of the liquid discharge apparatus of FIG. 1 with the covers open.
Figure 4:
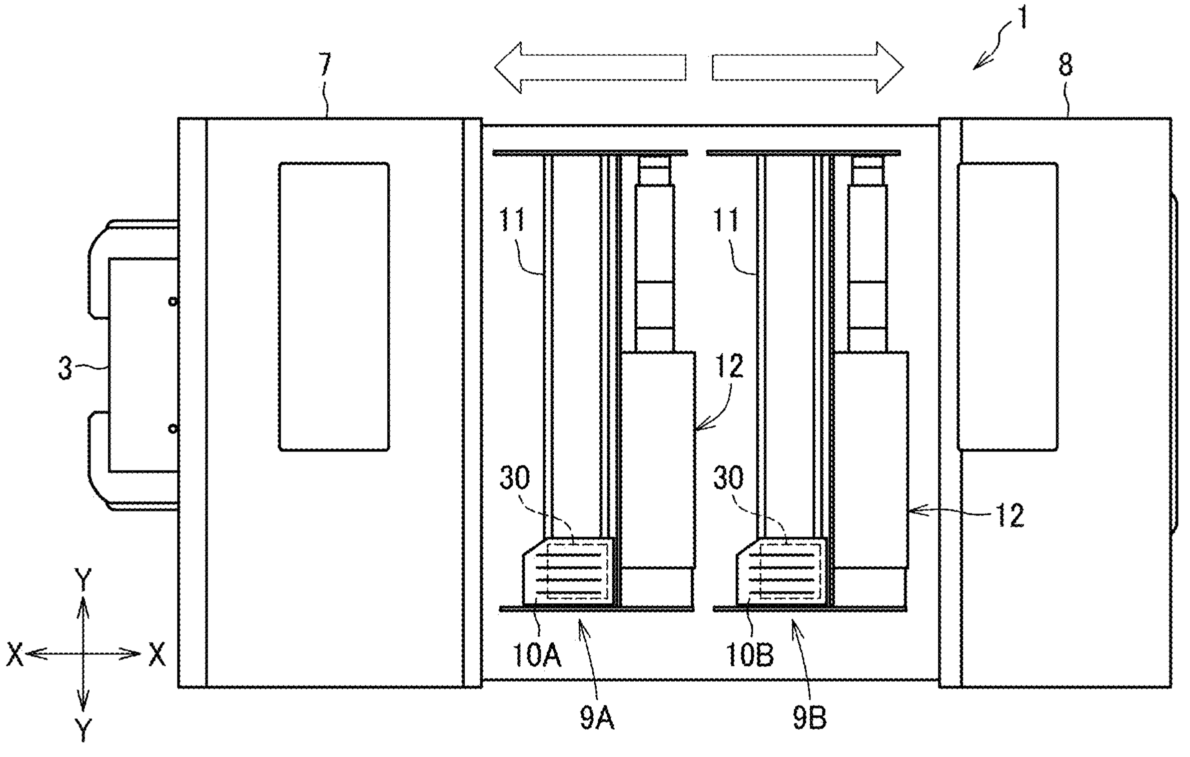
FIG. 4 is a plan view of the liquid discharge apparatus illustrated in FIG. 3.

FIG. 1 is a perspective view of a liquid discharge apparatus 1 according to an embodiment of the present disclosure, with covers closed, and FIG. 2 is a plan view thereof. FIG. 3 is a perspective view of the liquid discharge apparatus 1 with the covers open, and FIG. 4 is a plan view thereof. X directions in FIG. 1 are a front-rear direction, a sub-scanning direction, and a recording medium conveyance direction of the liquid discharge apparatus 1. Y directions in FIG. 1 are a transverse direction and a main scanning direction of the liquid discharge apparatus 1. Z directions in FIG. 1 are a vertical direction. The X directions and the Y directions are parallel to a surface, onto which a liquid is discharged, of a recording medium on the stage 3 but may have some error. The X, Y, and Z directions are orthogonal to each other.

As illustrated in FIGS. 1 and 2, the liquid discharge apparatus 1 includes a stage 3 in front of a housing 2. The stage 3 is mounted on a guide rail 4. The guide rail 4 extends in the X directions. A control panel 5 is disposed on a front face of the housing 2. An ink cartridge 6 is detachably attached to a side face of the housing 2. A front cover 7 and a rear cover 8 as an opening-and-closing cover are disposed over the housing 2. The opening-and-closing cover exposes or covers an interior of the liquid discharge apparatus 1.

The stage 3 has a flat upper face on which the recording medium is placed. The upper face of the stage 3 is parallel to the X directions and the Y directions. The stage 3 moves on the guide rail 4 to reciprocate in both the X directions. The stage 3 is movable up and down in the Z directions. Thus, the height of the recording medium placed on the stage 3 is adjustable.

The front cover 7 and the rear cover 8 are movable in both the X directions. Although the front cover 7 and the rear cover 8 are movable in the X directions in the present embodiment, a cover may be movable in a direction other than the X directions.

In FIG. 1, the front cover 7 has been moved backward and the rear cover 8 has been moved forward to close the front cover 7 and the rear cover 8. On the other hand, in FIG. 3, the front cover 7 is moved forward (i.e., in a front direction) and the rear cover 8 is moved backward (i.e., in a rear direction) in the conveyance direction to open the front cover 7 and the rear cover 8. As described above, the front cover 7 and the rear cover 8 are slidably opened and closed, thereby reducing an occupied space of the liquid discharge apparatus 1 including an opening and closing space of each of the front cover 7 and the rear cover 8 as compared with a configuration in which the front cover 7 and the rear cover 8 are opened and closed in the vertical direction. The front cover 7 and the rear cover 8 have openings at both ends in the front-rear direction. When the front cover 7 and the rear cover 8 are closed, the front cover 7 and the rear cover 8 are continuously arranged in the front-rear direction.

As illustrated in FIGS. 3 and 4, an apparatus body 50 of the liquid discharge apparatus 1 includes, for example, the housing 2 and liquid discharge units 9A and 9B mounted on the housing 2. In the present embodiment, specifically, the apparatus body 50 is a portion of the liquid discharge apparatus 1 other than the front cover 7 and the rear cover 8. The front cover 7 and the rear cover 8 are slidable in the X directions relative to the apparatus body 50.

Figure 5:
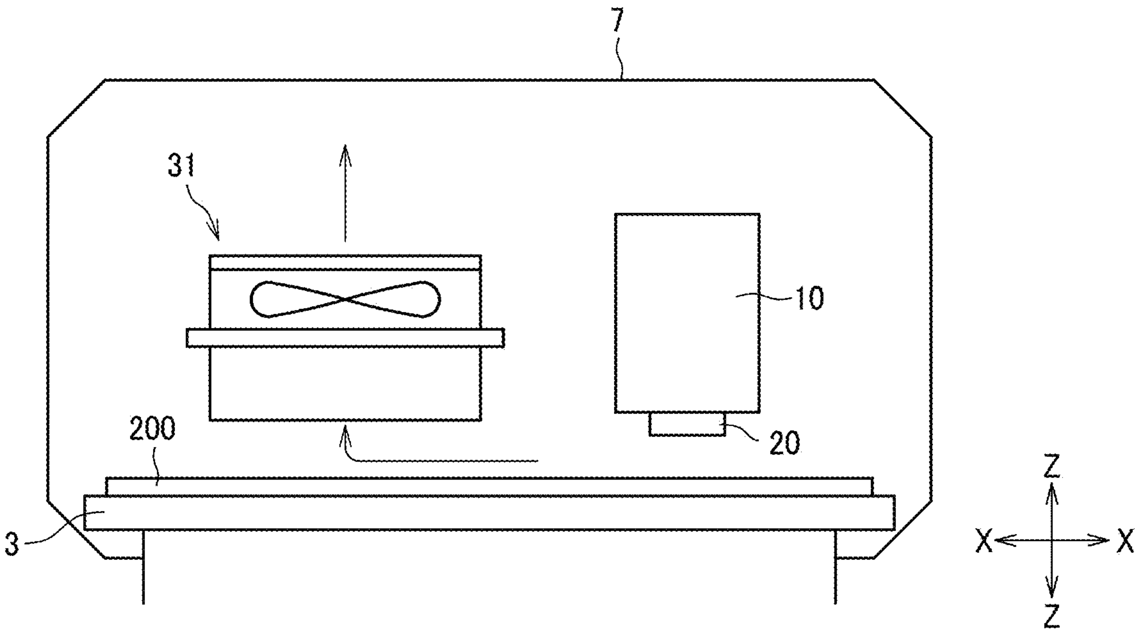
FIG. 5 is a side view of the liquid discharge apparatus of FIG. 1, illustrating an airflow inside a front cover.
Figure 6:
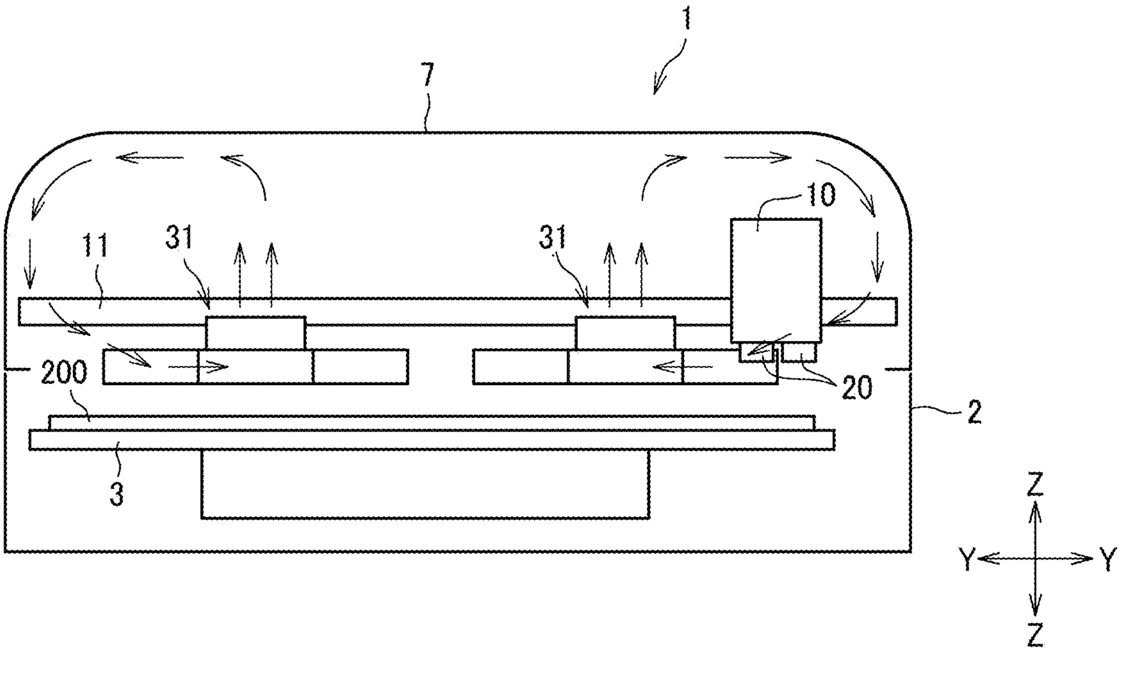
FIG. 6 is a front view of the liquid discharge apparatus of FIG. 5, illustrating the airflow inside the front cover.

The front cover 7 and the rear cover 8 are opened to expose the liquid discharge units 9A and 9B to the outside of the liquid discharge apparatus 1. When the liquid discharge units 9A and 9B are exposed to the outside, an operator can clean a maintenance unit 30, a liquid discharge head 20 (see FIGS. 5 and 6), and the surrounding thereof, or can replace carriages 10A and 10B. The front cover 7 and the rear cover 8 are closed during image formation. As a result, the liquid discharge units 9A and 9B are covered by the front cover 7 and the rear cover 8 to block access to operation units such as the carriages 10A and 10B of the liquid discharge units 9A and 9B from the outside. The liquid discharge units 9A and 9B are disposed in the closed space in the front cover 7 or the rear cover 8. Accordingly, mist of ink (an example of a liquid) is prevented from scattering to environs outside the liquid discharge apparatus 1 while the liquid discharge head 20 discharges the ink to the recording medium such as a sheet 200 (i.e., during liquid discharge operation). Further, the liquid discharge units 9A and 9B includes a fan 31 to circulate an airflow in the front cover 7 or the rear cover 8 as illustrated in FIGS. 5 and 6, thereby collecting the generated mist of the ink in the front cover 7 or the rear cover 8.

The liquid discharge apparatus 1 of the present embodiment includes the two liquid discharge units 9A and 9B arranged side by side in the X directions. The liquid discharge unit 9A discharges color ink and white ink. The liquid discharge unit 9B discharges a pretreatment liquid. The liquid discharged by each of the liquid discharge units 9A and 9B is not limited to the above example, and any liquid of the color ink, the white ink, and the pretreatment liquid may be discharged by each of the liquid discharge units 9A and 9B. In particular, when the recording medium is a fabric, the pretreatment liquid is preferably applied to the recording medium before the image formation using the ink. In other words, one of the liquid discharge units 9A and 9B preferably discharges the pretreatment liquid.

Since the liquid discharge units 9A and 9B have similar configurations, the liquid discharge unit 9A is described below. The liquid discharge unit 9A includes the carriage 10A, a guide rod 11, an electrical component unit 12, and the maintenance unit 30. The liquid discharge units 9A and 9B and the carriages 10A and 10B are also referred to simply as a liquid discharge unit 9 and a carriage 10, respectively, unless distinguished.

The guide rod 11 extends in the main scanning direction. The carriage 10 is movable in the main scanning direction along the guide rod 11. The carriage 10 includes multiple liquid discharge heads 20. The maintenance unit 30 is disposed at a position facing the guide rod 11 outside a liquid discharge region on one side in the transverse direction (Y directions).

The electrical component unit 12 includes, for example, a board and an electrical component cover covering the board. The electrical component unit 12 includes a control unit that controls the liquid discharge operation.

The maintenance unit 30 includes, for example, a wiping member that cleans a nozzle face of the liquid discharge head 20 and a suction mechanism that sucks the nozzle face. The wiping member may be a wiper made of, for example, rubber, or a web made of, for example, nonwoven fabric.

A process of forming an image on the recording medium by the liquid discharge head 20 is described below.

The recording medium is placed on the stage 3 and conveyed along the guide rail 4. A light emitting element including a light emitting diode (LED) is driven to emit light. The light emitting element and a light receiving element function as a height detector that detects the height of the recording medium on the stage 3 to optimally adjust the distance between the recording medium and the carriages 10A and 10B. Then, the recording medium is conveyed to a rear side of the liquid discharge apparatus 1, and the pretreatment liquid is applied to the recording medium by the liquid discharge unit 9B. Specifically, while the carriage 10B moves in the main scanning direction along the guide rod 11, the liquid discharge unit 9B discharges the pretreatment liquid from nozzles of the liquid discharge head 20 to apply the pretreatment liquid to the entire width of the recording medium in the main scanning direction. The application of the pretreatment liquid is repeated at multiple positions in the sub-scanning direction, thereby applying the pretreatment liquid to the entire recording medium. After that, the stage 3 moves forward, and the liquid discharge unit 9A discharges the color ink of multiple colors onto the recording medium by a similar method by the liquid discharge unit 9B. When white color is printed on the recording medium, for example, the liquid discharge unit 9A discharges the white ink onto the recording medium, the stage 3 moves to the rear side of the liquid discharge unit 9A again, and the liquid discharge unit 9A discharges the color ink onto the recording medium. Thus, an image is formed on the recording medium.

When the stage 3 is raised to adjust the position of the recording medium with the front cover 7 closed, a part of body of the operator such as a finger may interfere with the front cover 7 or the stage 3. For example, the finger may be between a lower end face of a front plate of the front cover 7 facing the stage 3 and an upper face of the stage 3.

To prevent the above-described interference with the front cover 7 or the stage 3, in the present embodiment, the front cover 7 includes a retraction portion that is retracted upward (retractable above the stage 3). A configuration of the retraction portion is described below with reference to FIGS. 7 to 9.

Figure 7:
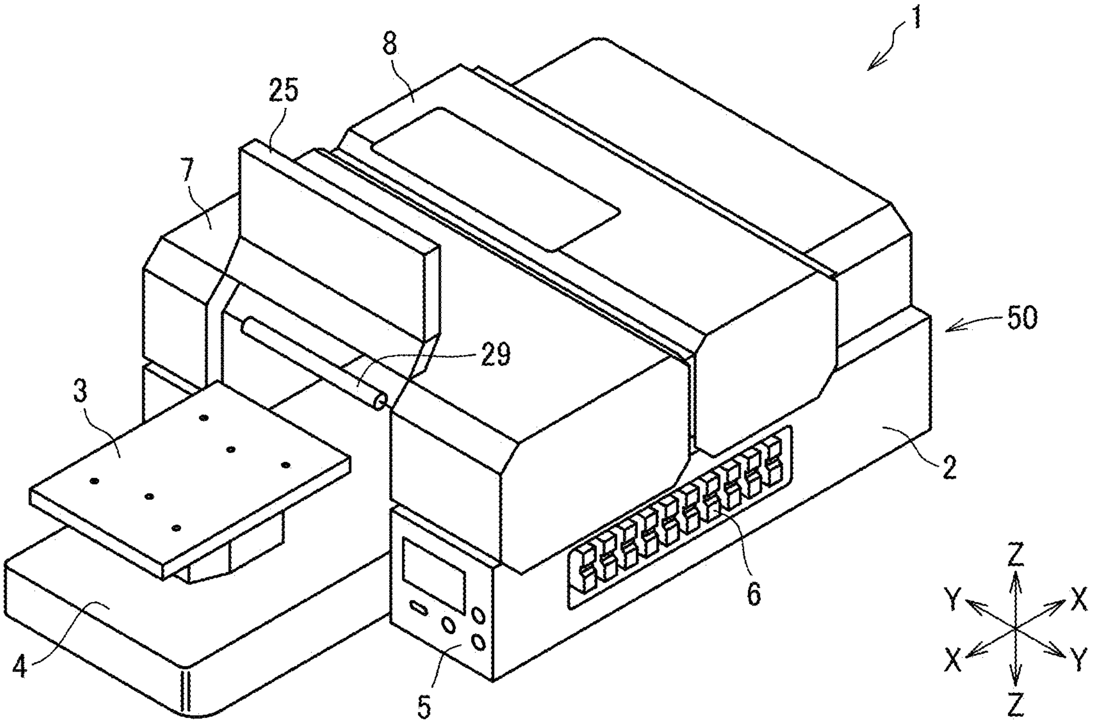
FIG. 7 is a perspective view of the liquid discharge apparatus of FIG. 1 with a door of the front cover open.
Figure 8:
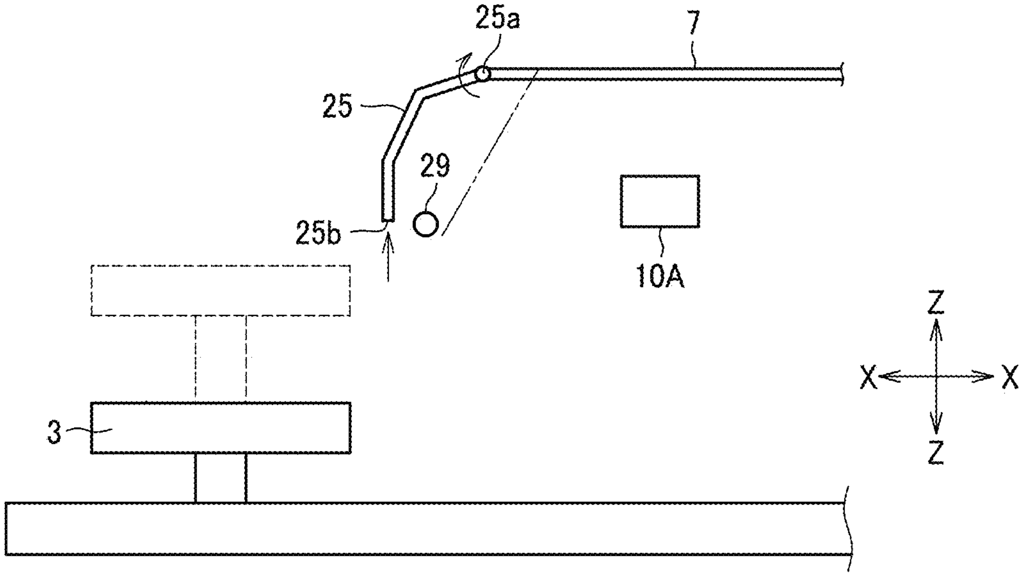
FIG. 8 is a cross-sectional view of the front cover and the surrounding thereof taken along line A-A in FIG. 1.

As illustrated in FIG. 7, the front cover 7 includes a door 25 as the retraction portion. The door 25 is a part of the front plate of the front cover 7 and disposed at an upper portion of the front cover 7. FIG. 8 is a cross-sectional view of the front cover 7 and the surrounding thereof taken along line A-A in FIG. 1. As illustrated in FIG. 8, a rotation shaft 25*a* of the door 25 is disposed at an end of a top plate of the front cover 7. The rotation shaft 25*a* extends, but not limited to strictly, in the Y direction. A lower end 25*b* of the door 25 is shifted from a position directly under the rotation shaft 25*a* in the X directions.

Figure 9:
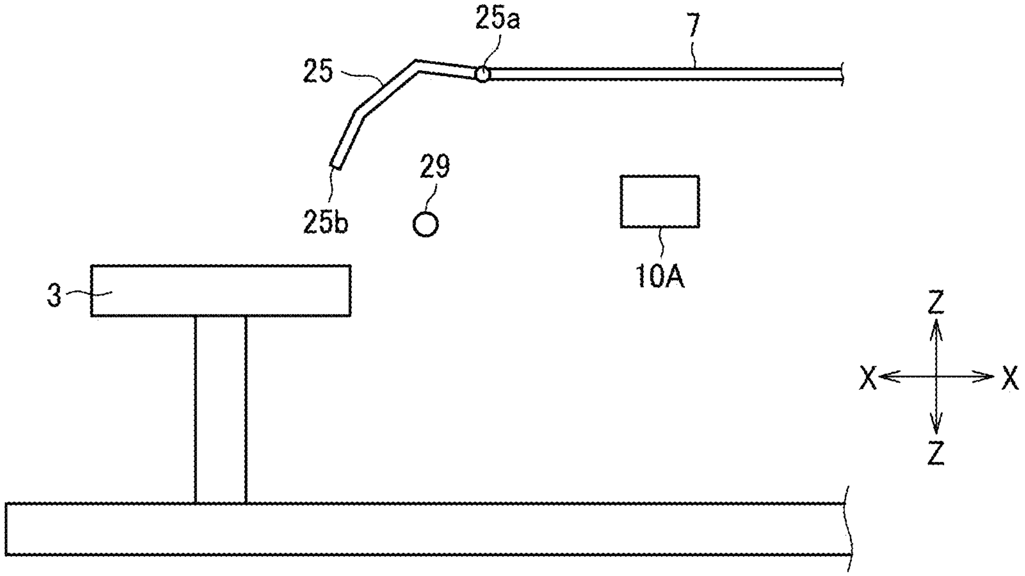
FIG. 9 is a cross-sectional view of the front cover illustrated in FIG. 8 with the door swung upward.

In the present embodiment, when the stage 3 is raised and the finger of the operator on the stage 3 presses the lower end 25*b* of the door 25, an upward force is applied to the lower end 25*b*. Accordingly, the door 25 is swung around the rotation shaft 25*a* in the clockwise direction in FIG. 8, and the lower end 25*b* of the door 25 is retracted upward as illustrated in FIG. 9. As a result, a part of the body such as a finger of the operator is prevented from interfering with the stage 3 or the front cover 7.

In the present embodiment, as illustrated in FIG. 8, when no external force acts on the door 25 and the door 25 is not swung in a closed state of the front cover 7, the rotation shaft 25*a* is shifted from a position directly above the lower end 25*b*. In other words, a portion to which the force is applied by the finger (i.e., the lower end 25*b*) and the rotation shaft 25*a* are disposed at different positions in the X directions. As a result, a force to swing the door 25 can be applied to the lower end 25*b*, and the door 25 is smoothly swung.

As illustrated in FIG. 8, a spread roller 29 as a contact roller is disposed on a front side inside the liquid discharge apparatus 1 between the door 25 and the carriage 10A of the liquid discharge unit 9A. In particular, when the recording medium is a fabric, fluff may occur on the surface of the fabric after applying the pretreatment liquid. If ink is discharged onto the fabric having the fluff, an image formed on the fabric may deteriorate. The spread roller 29 contacts the surface of the fabric to which the pretreatment liquid has been applied to smooth the surface of the fabric, thereby preventing an abnormal image.

In the present embodiment, as the door 25 is swung to expose the interior inside the front cover 7, the operator can access the spread roller 29 in front of the carriage 10A. As a result, the operator can easily clean and replace the spread roller 29.

In the present embodiment, the front plate of the front cover 7 has a vertical plane, and an upper portion of the front plate is chamfered. The front plate of the front cover 7 having the vertical plane provides a large space on the front side inside the front cover 7 as compared with a front plate of the front cover 7 having an inclined plane indicated by the dashed double-dotted line in FIG. 8. In other words, when a front end of the front cover 7 is disposed at the same position, the front plate of the front cover 7 having the vertical plane can provide a larger space on the front side inside the front cover 7 than the front plate having the inclined plane. Such a configuration allows the spread roller 29 to be arranged in front of the carriage 10A and inside the front cover 7.

Modifications of the door 25 are described below.

Figure 10:
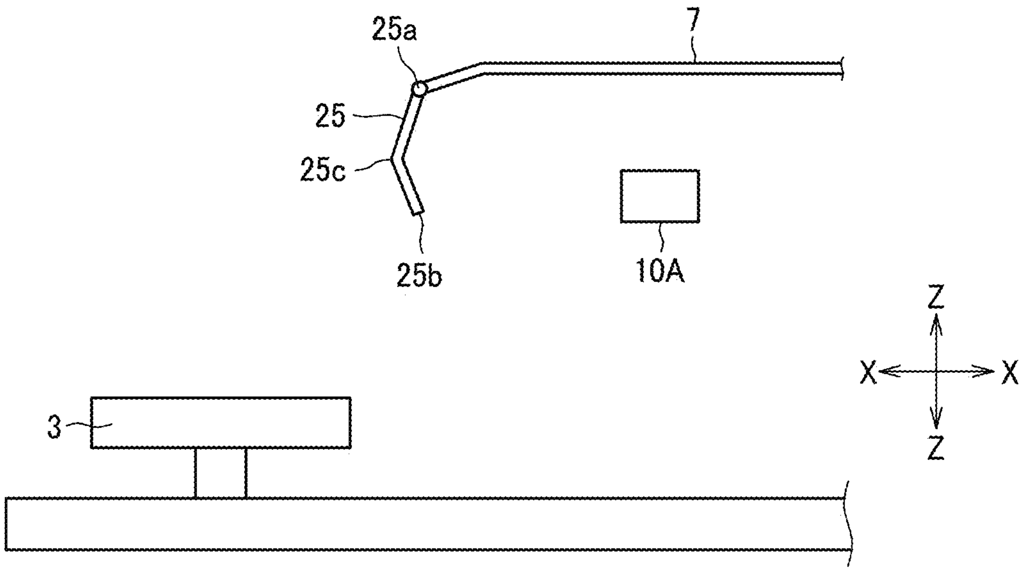
FIG. 10 is a cross-sectional view of the front cover including a door according to a modification of the embodiment of FIG. 8 and the surrounding thereof.

In the embodiment illustrated in FIG. 10, the door 25 has a bent portion 25*c* between the rotation shaft 25*a* and the lower end 25*b*. The rotation shaft 25*a* is disposed directly above the lower end 25*b*.

An upper portion of the door 25 from the rotation shaft 25*a* to the bent portion 25*c* is inclined so as to project forward while descending. On the other hand, the inclination direction changes at the bent portion 25*c* as a boundary, and a lower portion of the door 25 from the bent portion 25*c* to the lower end 25*b* is inclined so as to retreat backward while descending. The term "project forward" herein indicates projecting toward the outside of the liquid discharge apparatus 1 in the present embodiment. In other words, the bent portion 25*c* bends (projects) toward the outside of the liquid discharge apparatus 1.

When the finger of the operator pushes the lower end 25*b* or the lower portion of the door 25 upward while the stage 3 moves upward, the door 25 is swung in the clockwise direction around the rotation shaft 25*a* similarly to in FIG. 9, and the door 25 is retracted upward.

As described above, even when the rotation shaft 25*a* is disposed directly above the lower end 25*b*, the bent portion 25*c* of the door 25 allows the upward force by the finger of the operator to swing the door 25 in the clockwise direction. As a result, with the configuration according to the present embodiment, a part of the body such as the finger of the operator is prevented from interfering with the stage 3 or the front cover 7. In the embodiment illustrated in FIG. 10, the rotation shaft 25*a* may not be disposed directly above the lower end 25*b*.

Figure 11:
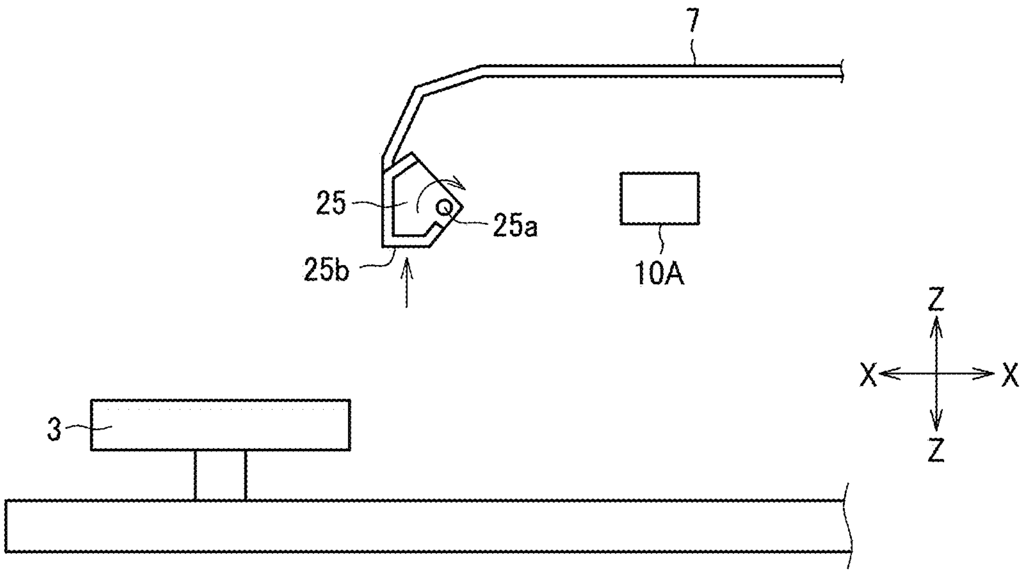
FIG. 11 is a cross-sectional view of the front cover including a door according to another modification of the embodiment of FIG. 8 and the surrounding thereof.

As illustrated in FIG. 11, in the present embodiment, the rotation shaft 25*a* of the door 25 is disposed inside the front cover 7. The rotation shaft 25*a* is disposed behind the lower end 25*b* of the door 25 in the front-rear direction inside the front cover 7.

Figure 12:
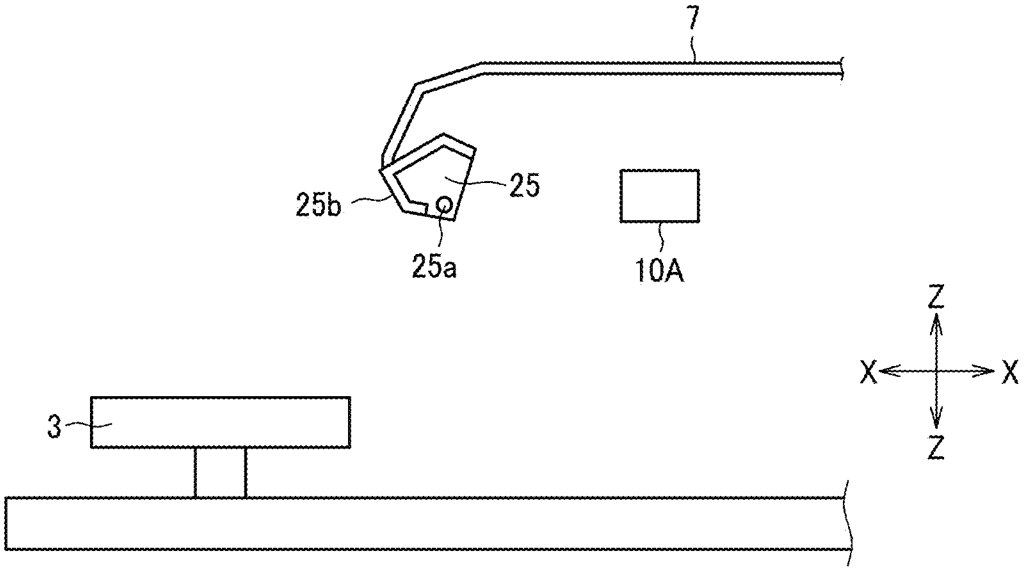
FIG. 12 is a cross-sectional view of the front cover with the door of FIG. 11 swung upward.

When the upward force is applied to the lower end 25*b* of the door 25 by the stage 3 moving upward, the door 25 is swung around the rotation shaft 25*a* in the clockwise direction as illustrated in FIG. 12. Accordingly, the lower end 25*b* is retracted upward. As a result, even when the door 25 of the front cover 7 is swung inward, a part of the body such as the finger of the operator is prevented from interfering with the stage 3 or the front cover 7.

In the present embodiment illustrated in FIG. 11, since the door 25 is swung toward the inside of the front cover 7, the outer size of the liquid discharge apparatus 1 is not substantially changed to swing the door 25. On the other hand, since the door 25 is swung outward in the above-described embodiment illustrated in FIG. 7, the space in the front cover 7 is large sufficient to flexibly arrange the spread roller 29 illustrated in FIG. 8. Due to such a configuration, the degree of flexibility in arrangement inside the front cover 7 increases.

Figure 13:
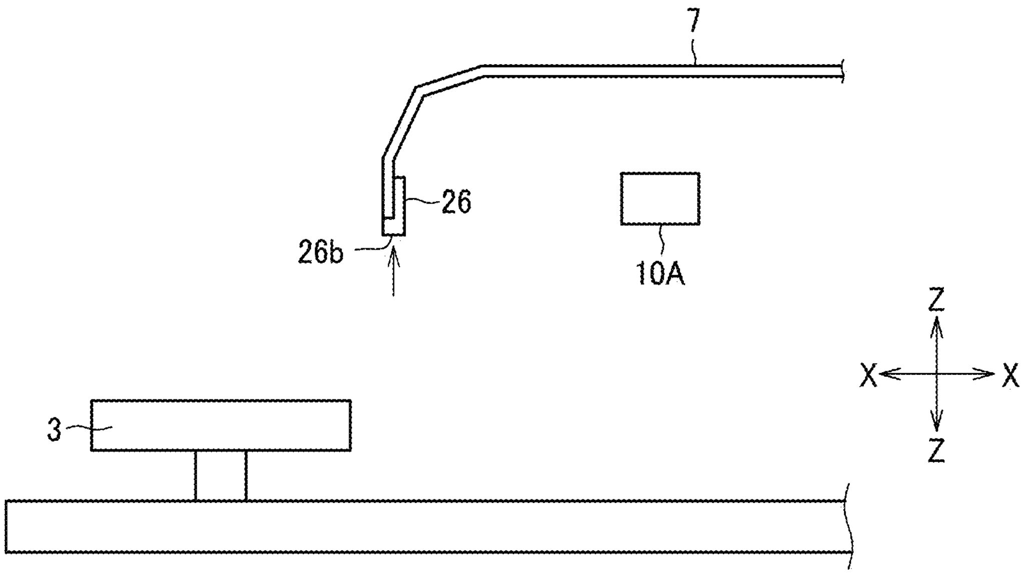
FIG. 13 is a cross-sectional view of a front cover including a slide portion and the surrounding thereof, according to an embodiment of the present disclosure.

In the above descriptions, the retraction portion of the front cover 7 is the door 25 that is swung around the rotation shaft 25*a* to be retracted upward, but embodiments of the present disclosure are not limited thereto. For example, as illustrated in FIG. 13, in the present embodiment, the front cover 7 includes a slide portion 26 as the retraction portion. The slide portion 26 is slidable in the vertical direction relative to a cover body of the front cover 7.

Figure 14:
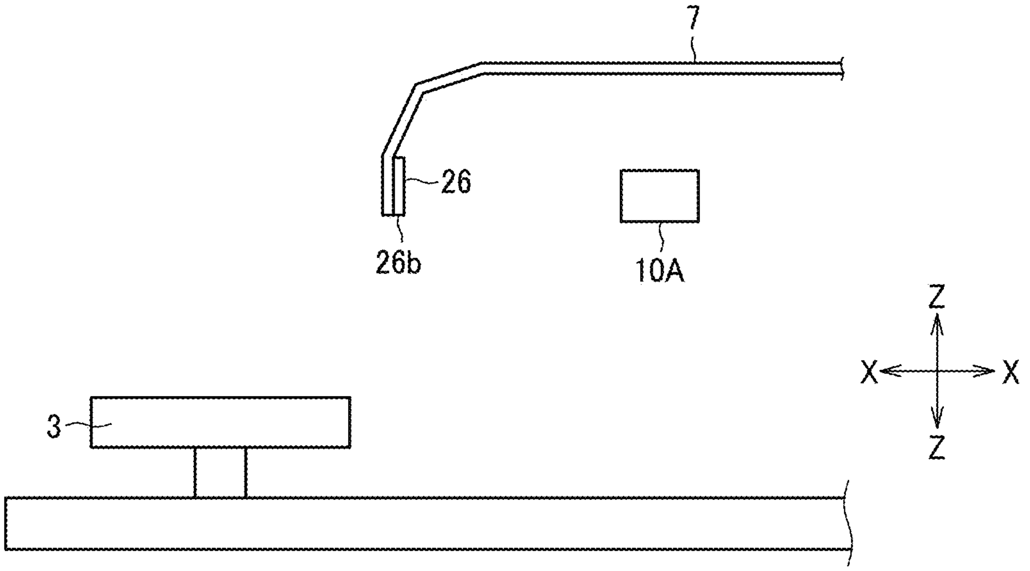
FIG. 14 is a cross-sectional view of the front cover with the slide portion of FIG. 13 slid upward.

When the stage 3 is raised and the finger of the operator pushes a lower end 26*b* of the slide portion 26 upward, the slide portion 26 slides relative to the cover body of the front cover 7 to be retracted upward as illustrated in FIG. 14. As a result, a part of the body such as the finger of the operator is prevented from interfering with the stage 3 or the front cover 7.

Figure 15:
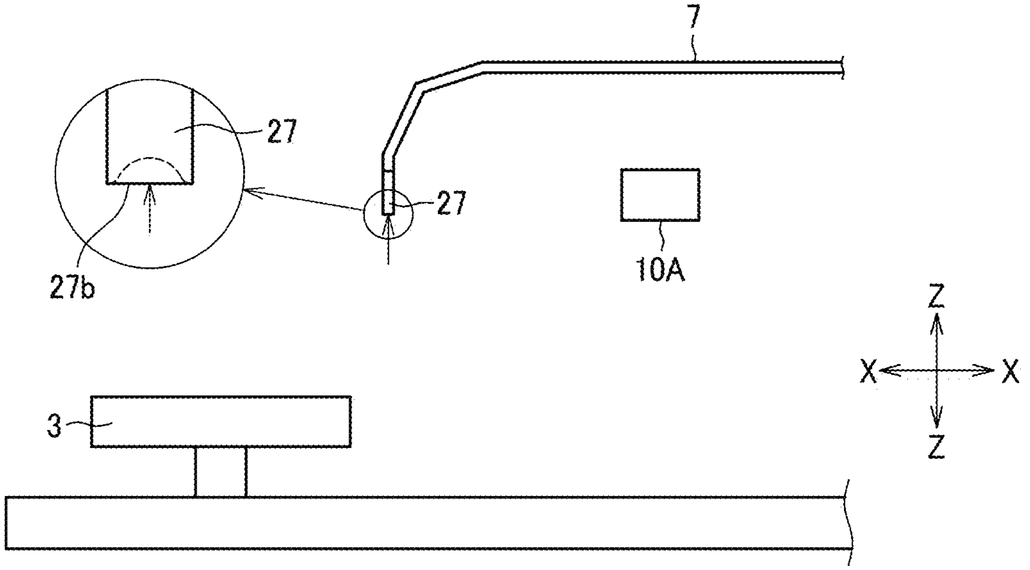
FIG. 15 is a cross-sectional view of a front cover including an elastic deformation portion and the surrounding thereof, according to an embodiment of the present disclosure.

Further, in the embodiment illustrated in FIG. 15, the front cover 7 includes an elastic deformation portion 27 as the retraction portion. The elastic deformation portion 27 is disposed in a portion of the front cover 7 including a lower end 27*b* at a position facing the stage 3. The elastic deformation portion 27 is made of, for example, a rubber material.

When the stage 3 is raised and the finger of the operator pushes the lower end 27*b* of the elastic deformation portion 27 upward, the elastic deformation portion 27 is elastically deformed and the lower end 27*b* is recessed (retracted) upward as indicated by the dashed line in the partially enlarged view in FIG. 15. As a result, a part of the body such as the finger of the operator is prevented from interfering with the stage 3 or the front cover 7.

Figure 16:
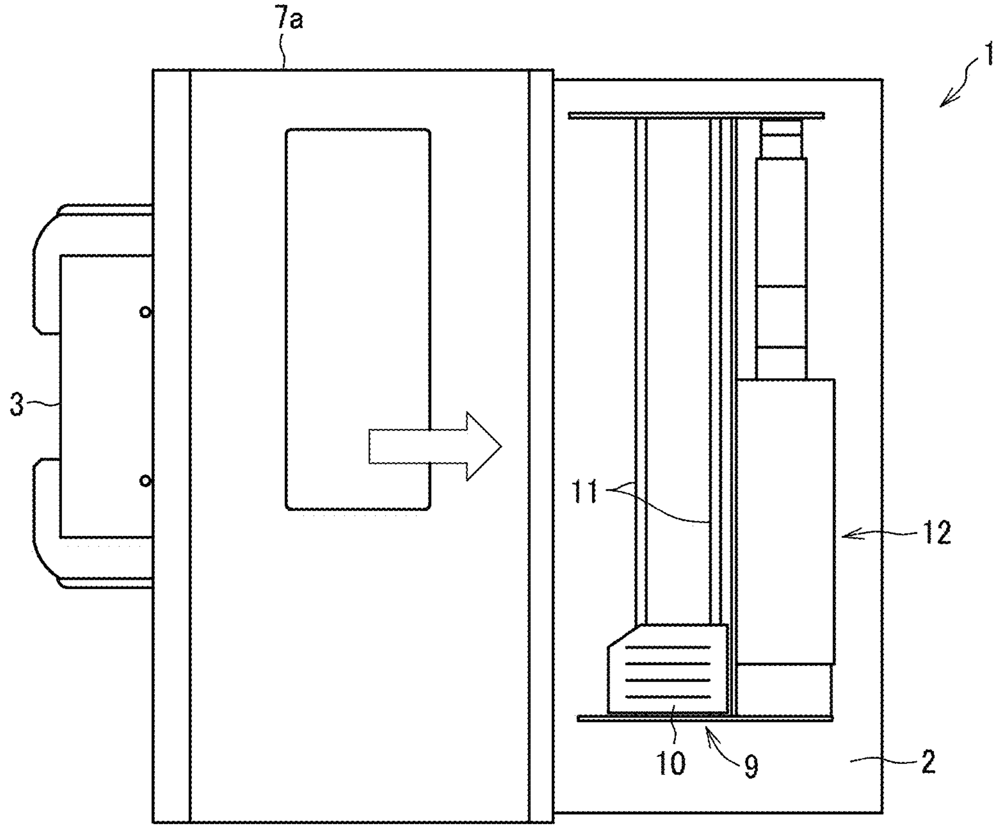
FIG. 16 is a plan view of a liquid discharge apparatus including one liquid discharge unit, according to an embodiment of the present disclosure.
Figure 17:
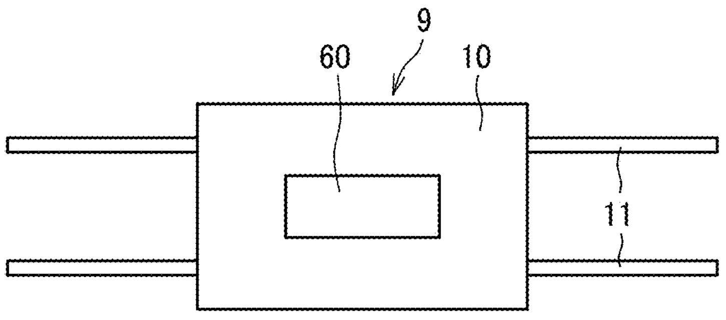
FIG. 17 is a plan view of a liquid discharge unit including one liquid discharge head unit mounted on one carriage, according to an embodiment of the present disclosure.
Figure 18:
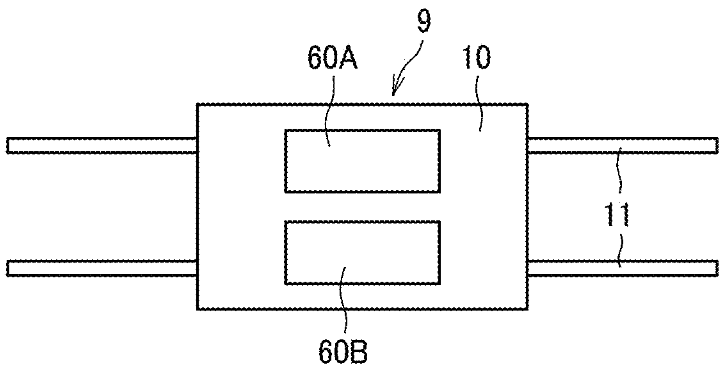
FIG. 18 is a plan view of a liquid discharge unit including two liquid discharge head unit mounted on one carriage, according to an embodiment of the present disclosure.
Figure 19:
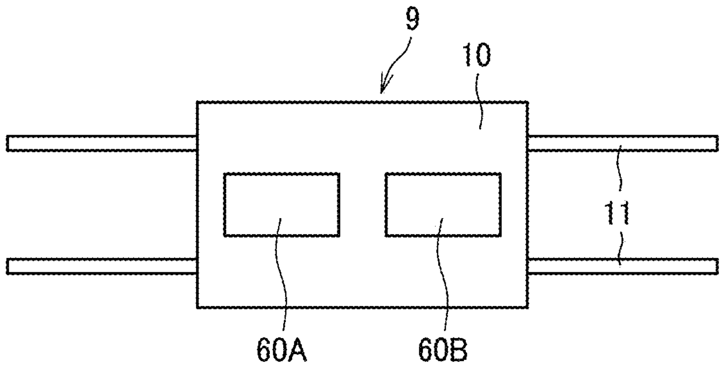
FIG. 19 is a plan view of a liquid discharge unit including two liquid discharge head unit mounted on one carriage in a different arrangement from FIG. 18, according to an embodiment of the present disclosure.

In the above descriptions, the liquid discharge apparatus 1 includes the multiple (two) liquid discharge units 9A and 9B, and each of the liquid discharge units 9A and 9B includes the corresponding carriage 10A or 10B including the liquid discharge head 20 and the guide rod 11, but embodiments of the present disclosure are not limited thereto. For example, as illustrated in FIG. 16, the liquid discharge apparatus 1 may include only one liquid discharge unit 9. The liquid discharge apparatus 1 includes a cover 7*a* as the opening-and-closing cover to expose and cover the liquid discharge unit 9. As illustrated in FIG. 17, the liquid discharge unit 9 includes the guide rod 11, the carriage 10, and a liquid discharge head unit 60 mounted on the carriage 10. The liquid discharge head unit 60 includes the multiple liquid discharge heads 20 but may include the single liquid discharge head 20. The liquid discharge head unit 60 discharges the pretreatment liquid, the white ink, or the color ink. The liquid discharge apparatus 1 may include three or more liquid discharge units 9. As illustrated in FIG. 18, the carriage 10 may include multiple liquid discharge head units 60A and 60B. In this case, for example, the white or color ink is discharged by the liquid discharge head unit 60A, and the pretreatment liquid is discharged by the liquid discharge head unit 60B. The liquid discharge head units 60A and 60B may be arranged side by side in the sub-scanning direction as illustrated in FIG. 18, or in a row in the main scanning direction as illustrated in FIG. 19. Similarly to the above-described embodiments, the retraction portion described above can be disposed in the front plate of the cover 7*a* above the stage 3 in the above-described liquid discharge apparatuses according to the embodiments of the present disclosure.

Figure 20:
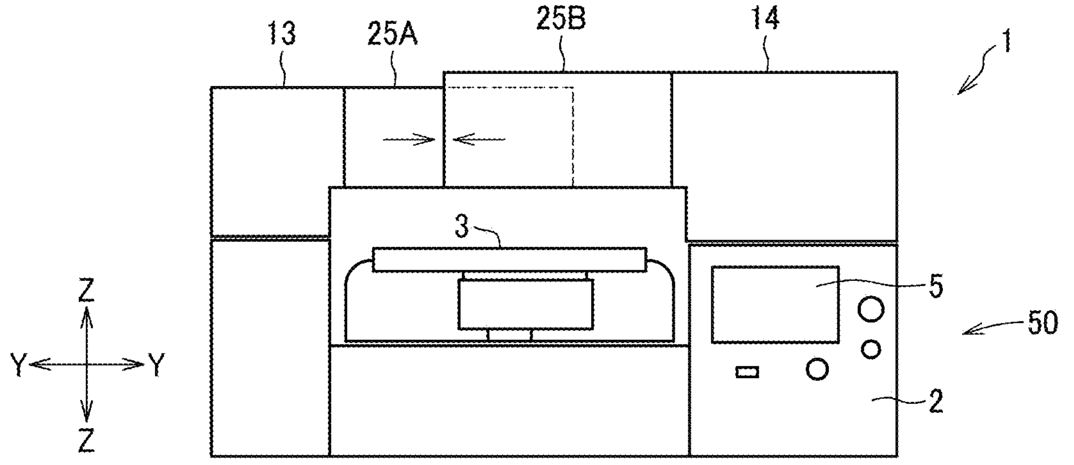
FIG. 20 is a front view of a liquid discharge apparatus including covers that open and close inward in a transverse direction (left-right direction in FIG. 20), with the covers closed, according to an embodiment of the present disclosure.

In the above descriptions, the single or the multiple opening-and-closing covers slide in the front-rear direction to expose and cover the interior of the liquid discharge apparatus 1, but embodiments of the present disclosure are not limited thereto. For example, as illustrated in FIG. 20, the liquid discharge apparatus 1 includes a left cover 13 and a right cover 14 as the opening-and-closing cover over the apparatus body 50 including the liquid discharge unit 9. FIG. 20 illustrates the liquid discharge apparatus 1 including the left cover 13 and the right cover 14 that are opened and closed inward in the transverse direction (left-right direction) of the apparatus indicated by arrows in FIG. 20, with the left cover 13 and the right cover 14 closed. The left cover 13 includes a door 25A as the retraction portion, and the right cover 14 includes a door 25B as the retraction portion.

Figure 21:
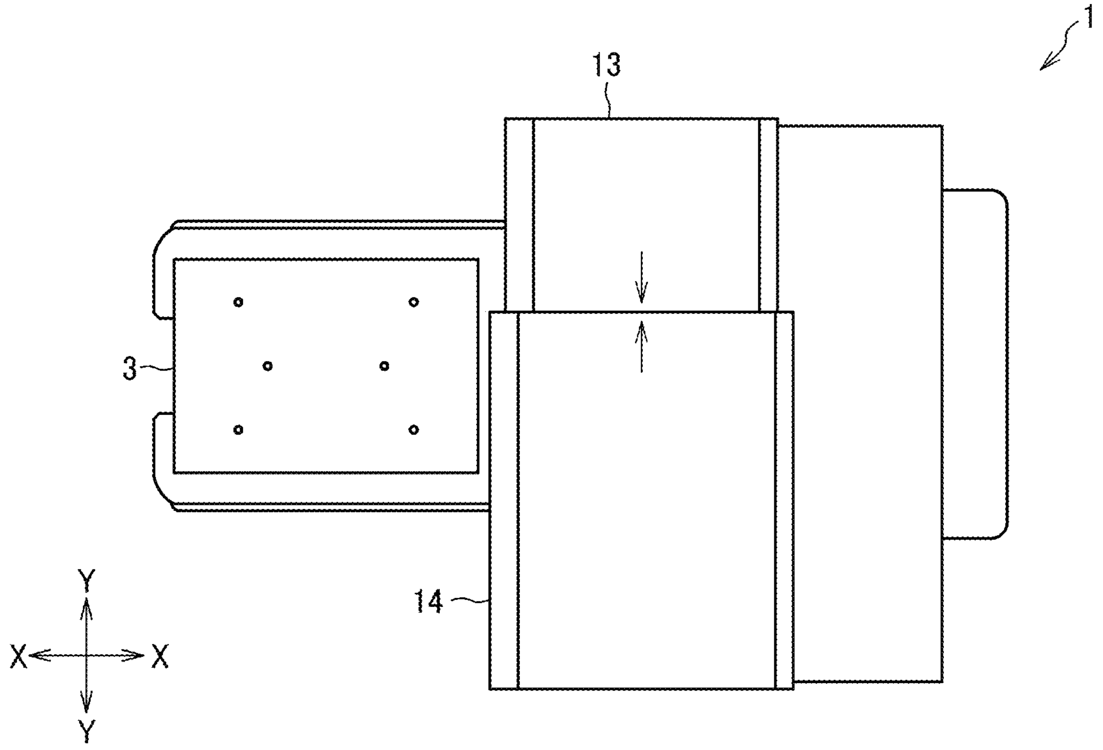
FIG. 21 is a plan view of the liquid discharge apparatus illustrated in FIG. 20.
Figure 22:
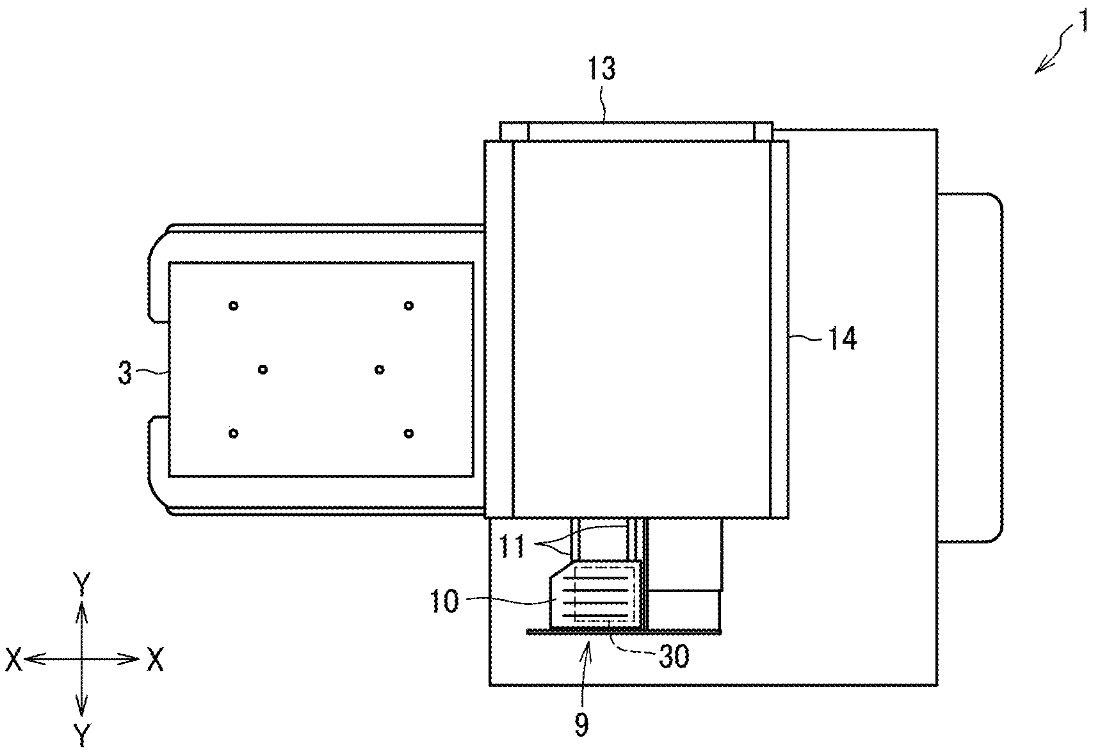
FIG. 22 is a plan view of the liquid discharge apparatus in FIG. 21 with a right cover open.
Figure 23:
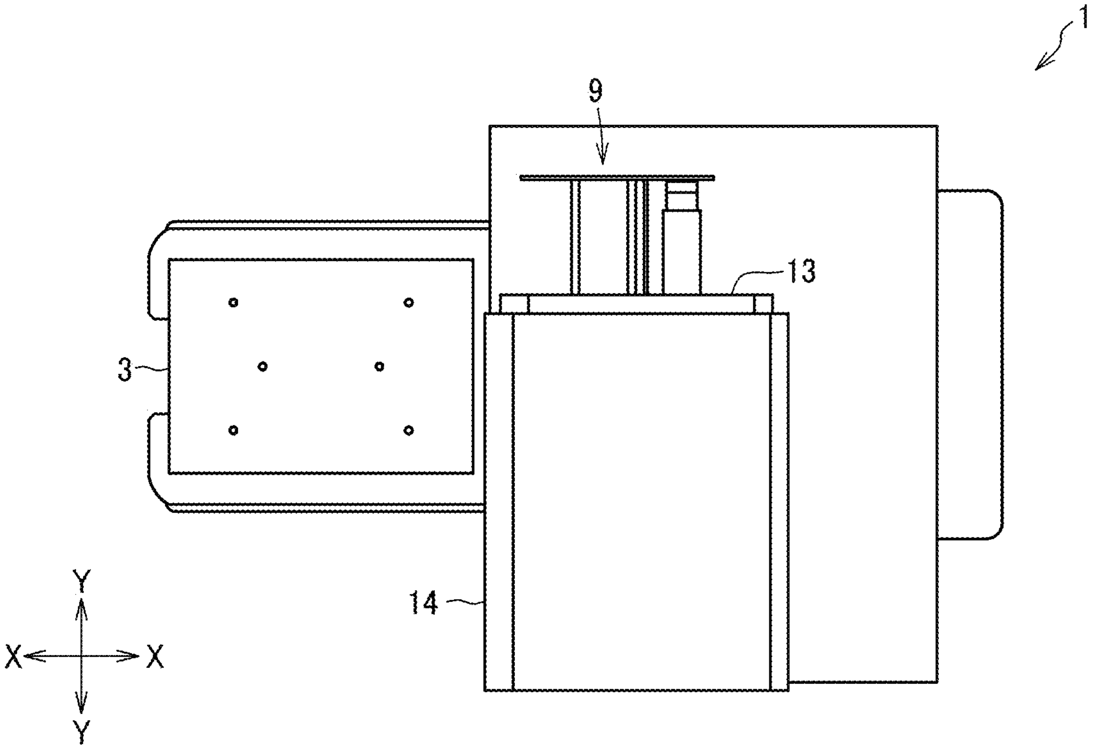
FIG. 23 is a plan view of the liquid discharge apparatus in FIG. 21 with a left cover open.

As illustrated in FIG. 21, when the left cover 13 and the right cover 14 are closed, the liquid discharge unit 9 is covered. On the other hand, as illustrated in FIG. 22, when the right cover 14 is moved leftward in FIG. 20 (upward in FIG. 22), a partial region on the right side of the liquid discharge unit 9 is exposed. As illustrated in FIG. 23, when the left cover 13 is moved rightward in FIG. 20 (downward in FIG. 23), a partial region on the left side of the liquid discharge unit 9 is exposed.

Figure 24:
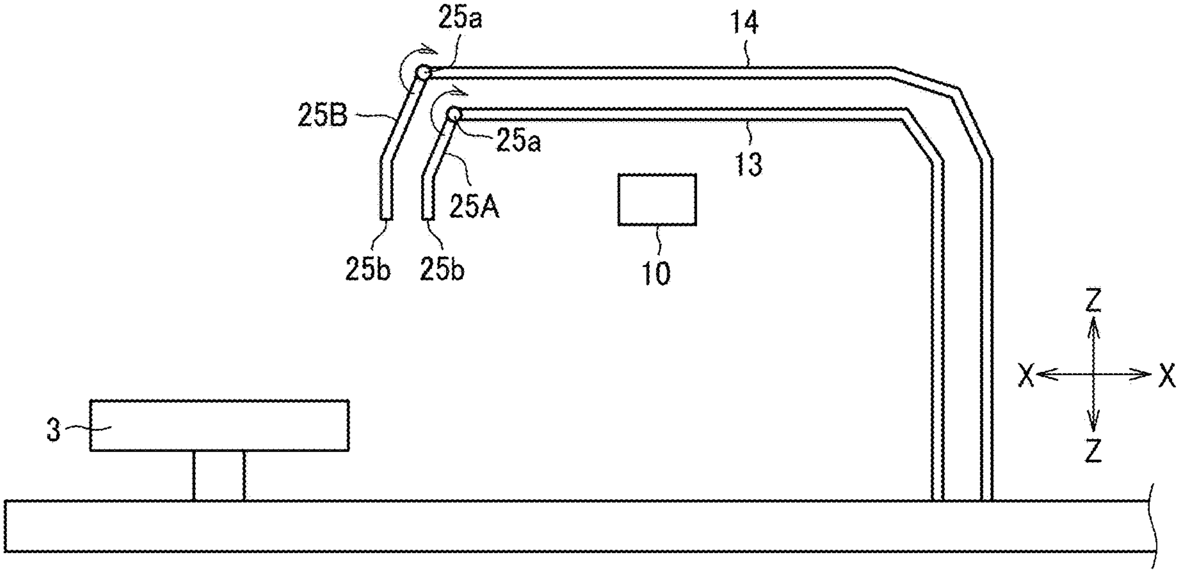
FIG. 24 is a side cross-sectional view of the liquid discharge apparatus illustrated in FIG. 21.

Also in the present embodiment, as illustrated in FIG. 24, when the upward force is applied to a pair of lower ends 25*b* of the doors 25A and 25B, the doors 25A and 25B are swung around the corresponding rotation shafts 25*a* in the clockwise direction in FIG. 24 to be retracted upward. As a result, the liquid discharge apparatus 1 prevents the interference with the stage 3 or the doors 25A and 25B.

Figure 25:
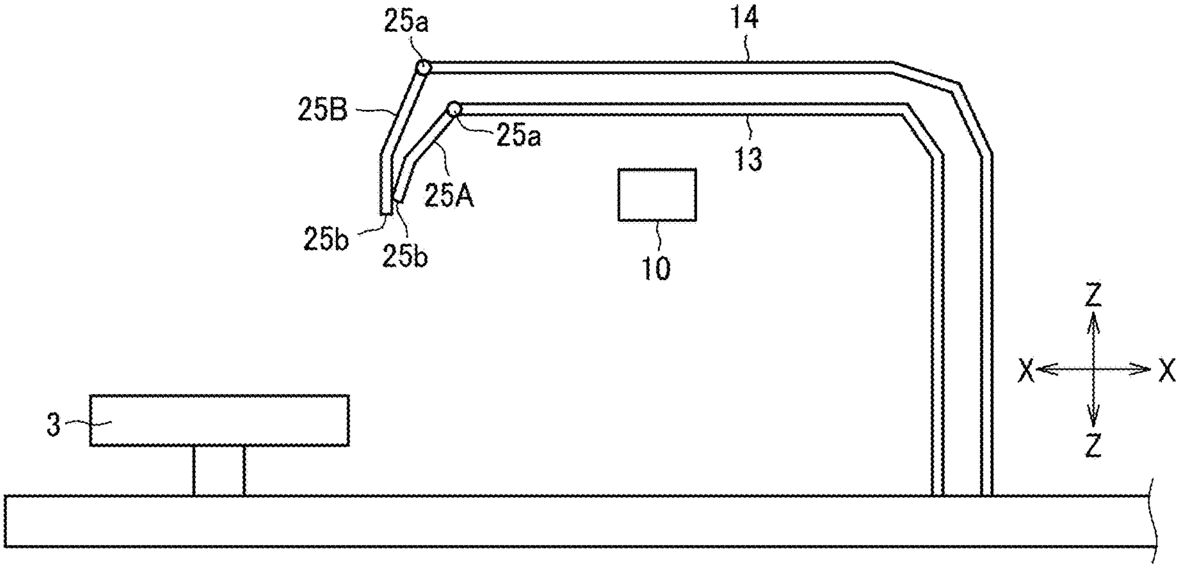
FIG. 25 is a side cross-sectional view of the liquid discharge apparatus illustrated in FIG. 21 with the door of the left cover swung upward.

As illustrated in FIG. 25, when an amplitude of swing of the inner door 25A is larger than that of the door 25B, the door 25A comes into contact with the door 25B and applies a force to swing the door 25B in the clockwise direction in FIG. 25.

Figure 26:
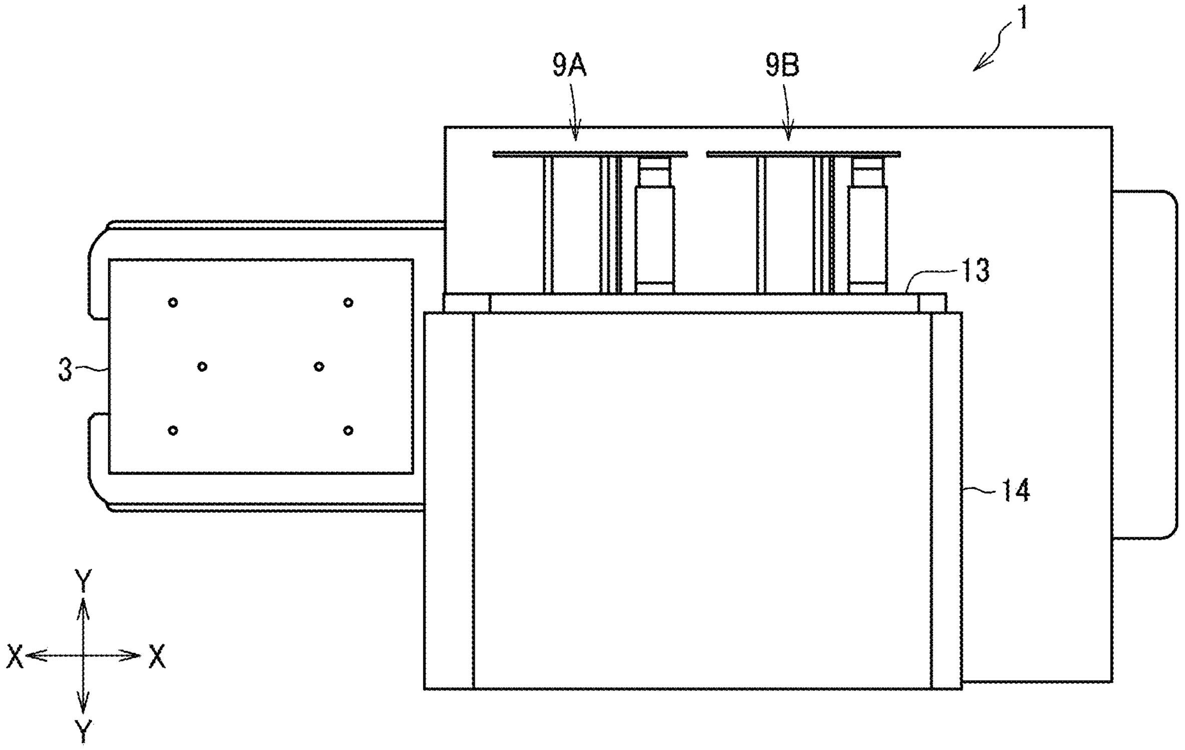
FIG. 26 is a plan view of a liquid discharge apparatus including multiple liquid discharge units and covers that open and close in a transverse direction, according to an embodiment of the present disclosure.

In the embodiment described above, the liquid discharge apparatus 1 includes only one liquid discharge unit 9 but may include the multiple liquid discharge units 9A and 9B in the left cover 13 and the right cover 14 that are opened inward in the left-right direction of the apparatus (top-bottom direction in FIG. 26) as illustrated in FIG. 26.

The left cover 13 and the right cover 14 are opened inward in the above-described embodiment, but embodiments of the present disclosure are not limited thereto. For example, as illustrated in FIG. 27, in the liquid discharge apparatus 1 according to the present embodiment, the left cover 13 and the right cover 14 may be opened outward as indicated by arrows in FIG. 27.

Figure 28:
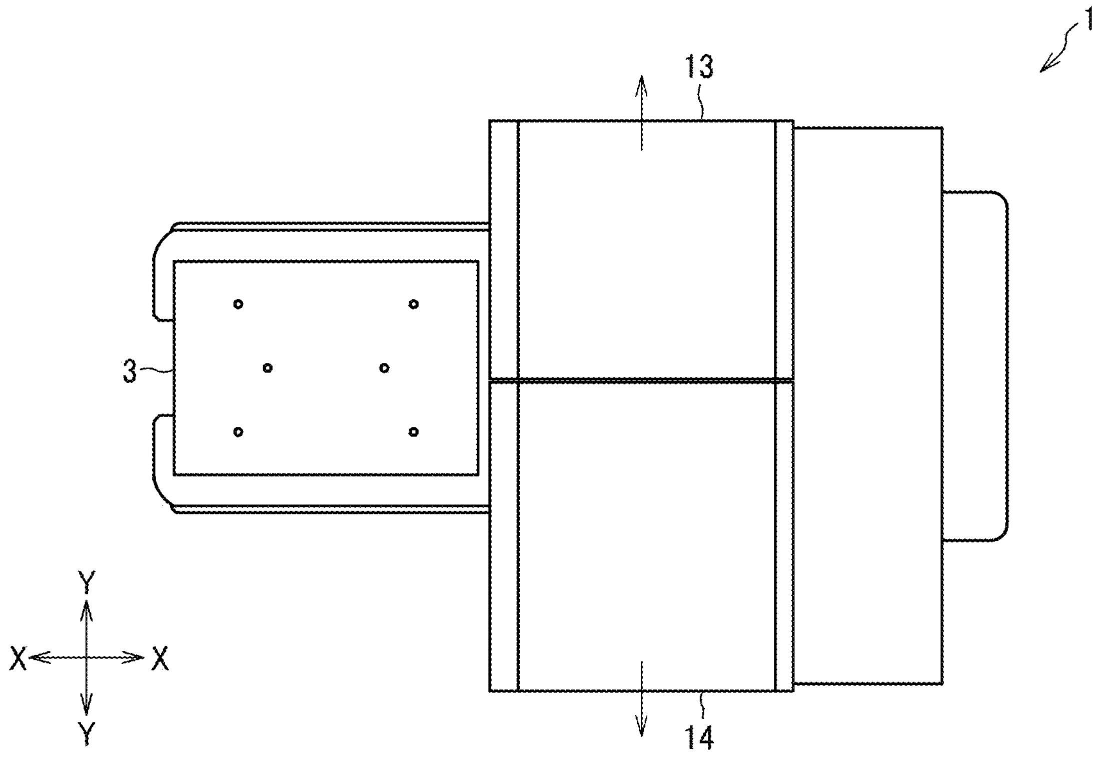
FIG. 28 is a plan view of the liquid discharge apparatus illustrated in FIG. 27 with the covers closed.
Figure 29:
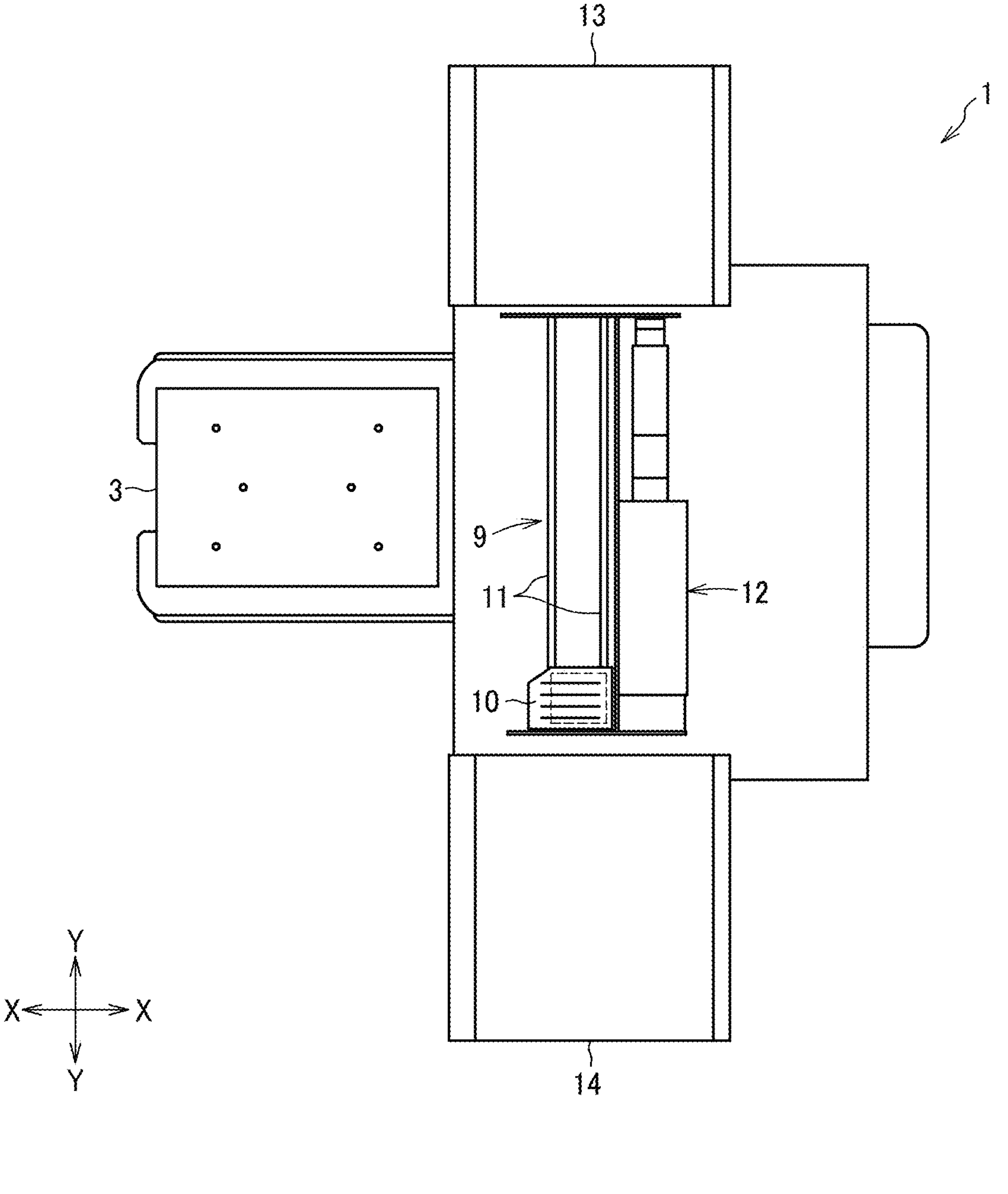
FIG. 29 is a plan view of the liquid discharge apparatus illustrated in FIG. 27 with the covers open.

As illustrated in FIG. 28, when the left cover 13 and the right cover 14 are closed, the liquid discharge unit 9 is covered by the left cover 13 and the right cover 14. As illustrated in FIG. 29, when the left cover 13 and the right cover 14 are opened, the liquid discharge unit 9 is exposed to the outside.

Figure 27:
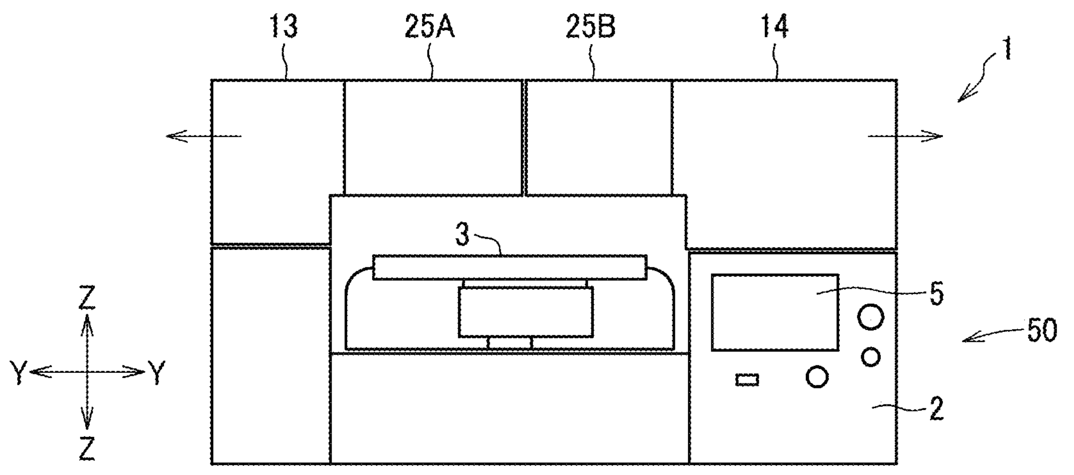
FIG. 27 is a front view of a liquid discharge apparatus including covers that open and close outward in a transverse direction, according to an embodiment of the present disclosure.

Also in the present embodiment, as illustrated in FIG. 27, the left cover 13 includes the door 25A as the retraction portion, and the right cover 14 includes the door 25B as the retraction portion. Similarly to the above-described embodiments, the doors 25A and 25B are retracted upward, thereby preventing, for example, the finger of the operator from interfering with the stage 3 or each of the left cover 13 and the right cover 14.

The configuration in which the left cover 13 and the right cover 14 are opened inward as illustrated in FIG. 20 can reduce the occupied space, which includes a movable area of the left cover 13 and the right cover 14, of the liquid discharge apparatus 1 as compared with the configuration in which the left cover 13 and the right cover 14 are opened outward as illustrated in FIG. 27.

Figure 30:
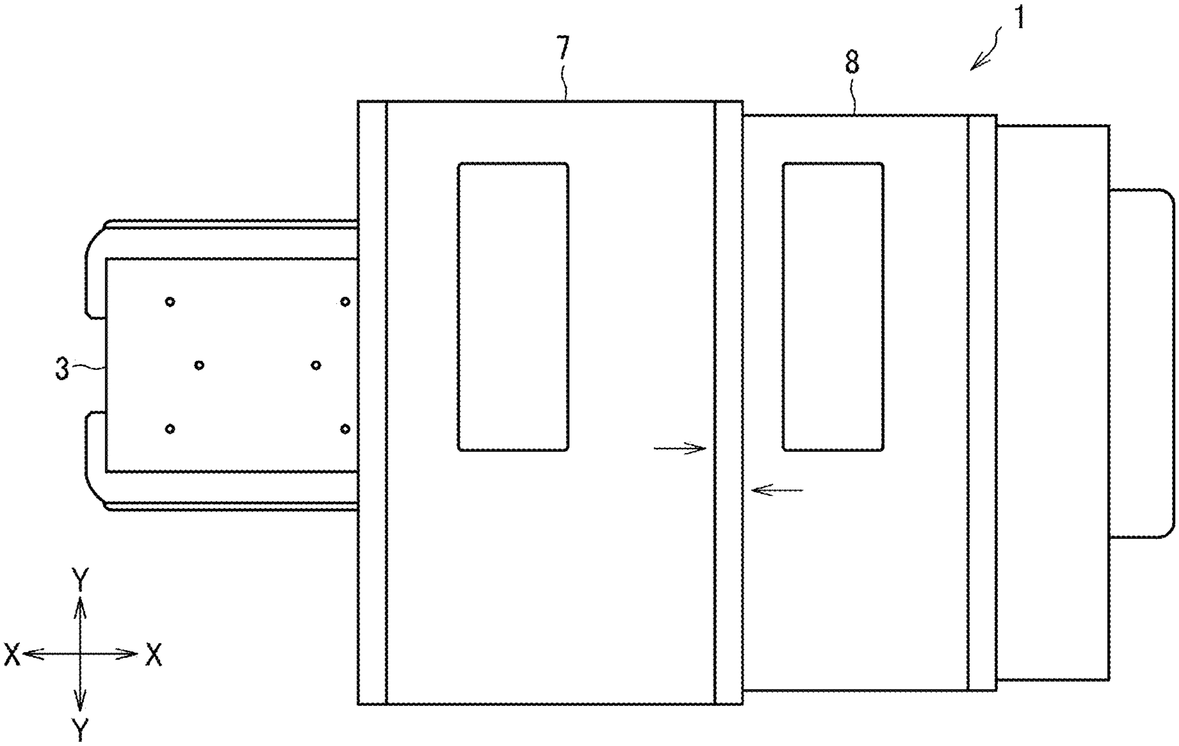
FIG. 30 is a plan view of a liquid discharge apparatus including covers that open and close inward in a front-back direction (left-right direction in FIG. 30), with the covers closed, according to an embodiment of the present disclosure.
Figure 31:
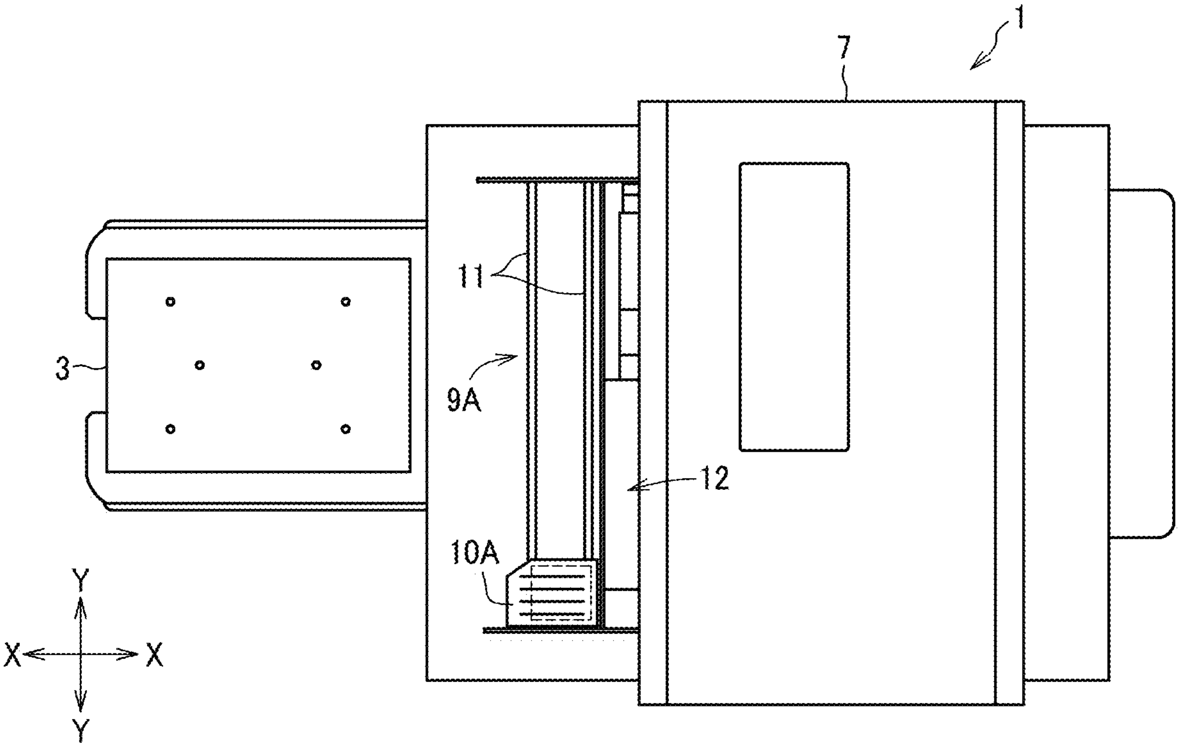
FIG. 31 is a plan view of the liquid discharge apparatus illustrated in FIG. 30 with the front cover open.
Figure 32:
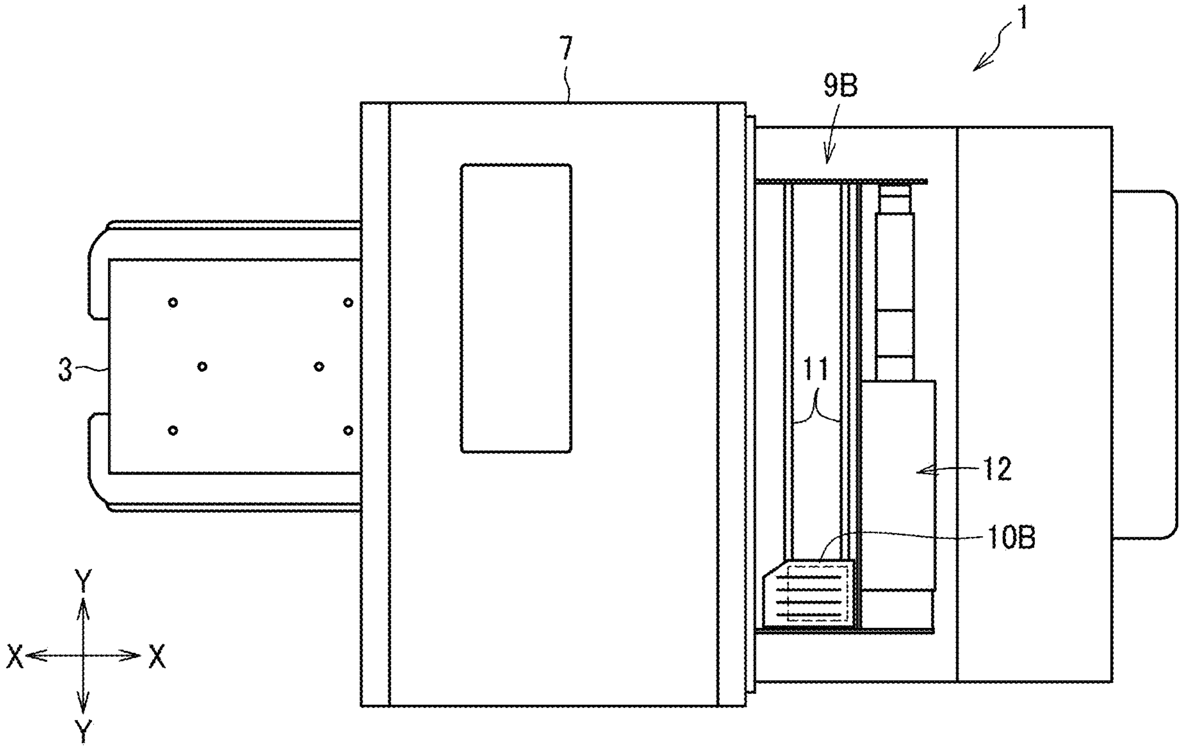
FIG. 32 is a plan view of the liquid discharge apparatus illustrated in FIG. 30 with a rear cover open.

Further, as illustrated in FIG. 30, the front cover 7 and the rear cover 8 may be opened inward in the front-rear direction. As illustrated in FIG. 31, when the front cover 7 is opened, the liquid discharge unit 9A is exposed to the outside. As illustrated in FIG. 32, when the rear cover 8 is opened, the liquid discharge unit 9B is exposed to the outside. Also in the liquid discharge apparatus 1 having the above-described configuration, the front cover 7 can include the door 25 as the retraction portion similarly to the embodiment illustrated in FIG. 8. As a result, for example, the finger of the operator is prevented from interfering with the stage 3 or the front cover 7.

In the above descriptions, the door (e.g., the door 25, 25A, or 25B) is provided as the retraction portion in the embodiments described above, but other retraction portion (e.g., the slide portion 26 and the elastic deformation portion 27) can be applied to the embodiments.

The above-described embodiments are illustrative and do not limit the present disclosure. Numerous additional modifications and variations are possible in light of the above teachings. It is therefore to be understood that within the scope of the appended claims In the present disclosure, the liquid to be discharged is not limited to a particular liquid as long as the liquid has a viscosity or surface tension to be discharged from a head (liquid discharge head). However, preferably, the viscosity of the liquid is not greater than 30 mPa·s under ordinary temperature and ordinary pressure or by heating or cooling. Examples of the liquid include a solution, a suspension, or an emulsion including, for example, a solvent, such as water or an organic solvent, a colorant, such as dye or pigment, a functional material, such as a polymerizable compound, a resin, or a surfactant, a biocompatible material, such as DNA, amino acid, protein, or calcium, and an edible material, such as a natural colorant. Such a solution, a suspension, or an emulsion can be used for, e.g., inkjet ink; surface treatment liquid; a liquid for forming an electronic element component, a light-emitting element component, or an electronic circuit resist pattern; or a material solution for three-dimensional fabrication.

The term “liquid” includes not only ink but also paint, a pretreatment liquid, a binder, and an overcoat liquid.

In the present disclosure, the term “liquid discharge apparatus” includes a carriage including a liquid discharge head and drives the liquid discharge head to discharge liquid. The term “liquid discharge apparatus” used in the present disclosure includes, in addition to apparatuses to discharge liquid to a recording medium serving as materials onto which liquid can adhere, apparatuses to discharge the liquid into gas (air) or liquid.

For example, the “liquid discharge apparatus” may further include devices relating to feeding, conveying, and ejecting of the material onto which liquid can adhere and also include a pretreatment device and an aftertreatment device.

The “liquid discharge apparatus” may be, for example, an image forming apparatus to form an image on a sheet by discharging ink, or a three-dimensional fabrication apparatus to discharge fabrication liquid to a powder layer in which powder material is formed in layers to form a three-dimensional object.

The “liquid discharge apparatus” is not limited to an apparatus that discharges liquid to visualize meaningful images such as letters or figures. For example, the liquid discharge apparatus may be an apparatus that forms meaningless images such as meaningless patterns or an apparatus that fabricates three-dimensional images.

The above-described term “material onto which liquid can adhere” represents a material on which liquid is at least temporarily adhered, a material on which liquid is adhered and fixed, or a material into which liquid is adhered to permeate. Specific examples of the “material onto which liquid can adhere” include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The “material onto which liquid can adhere” includes any material to which liquid adheres, unless particularly limited.

Examples of the “material onto which liquid can adhere” include any materials to which liquid can adhere even temporarily, such as paper, thread, fiber, fabric, leather, metal, plastic, glass, wood, and ceramic.

The term “liquid discharge apparatus” may be an apparatus to relatively move the liquid discharge head and the material onto which liquid can adhere. However, the liquid discharge apparatus is not limited to such an apparatus. For example, the liquid discharge apparatus may be a serial head apparatus that moves the liquid discharge head or a line head apparatus that does not move the liquid discharge head.

Examples of the liquid discharge apparatus further include: a treatment liquid applying apparatus that discharges a treatment liquid onto a sheet to apply the treatment liquid to the surface of the sheet, for reforming the surface of the sheet; and an injection granulation apparatus that injects a composition liquid, in which a raw material is dispersed in a solution, through a nozzle to granulate fine particle of the raw material.

The terms "image formation," "recording," "printing," "image printing," and "fabricating" used in the present disclosure may be used synonymously with each other.

Aspects of the present disclosure are, for example, as follows.

Aspect 1

A liquid discharge apparatus includes a liquid discharge head, a stage, a guide rail, and an opening-and-closing cover. The liquid discharge head discharges a liquid to a recording medium. The stage moves in a vertical direction to move the recording medium on the stage. The guide rail holds the stage. The stage is movable in a conveyance direction intersecting the vertical direction. The opening-and-closing cover is slidable in one of the conveyance direction and a main scanning direction intersecting both the conveyance direction and the vertical direction. The opening-and-closing cover includes a retraction portion retractable above the stage.

Aspect 2

In the liquid discharge apparatus according to Aspect 1, the retraction portion includes a door including a rotation shaft extending in the main scanning direction, and the door is swingable around the rotation shaft to move in the vertical direction.

Aspect 3

In the liquid discharge apparatus according to Aspect 2, the rotation shaft is shifted from a position directly above a lower end of the retraction portion in the conveyance direction in a closed state of the opening-and-closing cover.

Aspect 4

In the liquid discharge apparatus according to Aspect 2, the retraction portion includes a bent portion between a lower end of the retraction portion and the rotation shaft. The bent portion is bent toward an outside of the liquid discharge apparatus in the conveyance direction.

Aspect 5

In the liquid discharge apparatus according to any one of Aspects 1 to 4, the opening-and-closing cover has a front face extending in the vertical direction.

Aspect 6

The liquid discharge apparatus according to any one of Aspects 1 to 5 further includes a contact roller between the retraction portion and the liquid discharge head in the conveyance direction to contact a surface of the recording medium.

Aspect 7

In the liquid discharge apparatus according to any one of Aspects 1 to 6, the opening-and-closing cover includes a front cover and a rear cover. The front cover is slidable in a front direction in the conveyance direction, and the rear cover is slidable in a rear direction opposite to the front direction to be separated from the front cover, to open the opening-and-closing cover.

Aspect 8

In the liquid discharge apparatus according to any one of Aspects 2 to 7, the door is swung toward an outside of the liquid discharge apparatus to be retracted upward.

Aspect 9

In the liquid discharge apparatus according to any one of Aspects 2 to 7, the door is swung toward an inside of the liquid discharge apparatus to be retracted upward.

Aspect 10

In the liquid discharge apparatus according to Aspect 1, or in the liquid discharge apparatus according to Aspect 1 and at least any one of Aspect 5, 6, and 7, the retraction portion includes a slide portion slidable in the vertical direction.

Aspect 11

In the liquid discharge apparatus according to Aspect 1, or in the liquid discharge apparatus according to Aspect 1 and at least any one of Aspects 5, 6, and 7, the retraction portion includes an elastic deformation portion elastically deformable in an upward direction in the vertical direction.

As described above, according to one aspect of the present disclosure, the liquid discharge apparatus prevents, for example, a finger from interfering with the opening-and-closing cover or the stage.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge apparatus comprising:

a liquid discharge head configured to discharge a liquid to a recording medium;

a stage configured to move in a vertical direction to move the recording medium on the stage;

a guide rail configured to hold the stage, the stage being movable in a conveyance direction intersecting the vertical direction; and an opening-and-closing cover configured to slide in one of the conveyance direction and a main scanning direction intersecting both the conveyance direction and the vertical direction and including a retraction portion that is configured to retract above the stage, wherein the retraction portion includes a door including a rotation shaft extending in the main scanning direction, and the door is configured to swing around the rotation shaft to move in the vertical direction.

2. The liquid discharge apparatus according to claim 1, wherein the rotation shaft is configured to shift from a position directly above a lower end of the retraction portion in the conveyance direction in a closed state of the opening-and-closing cover.

3. The liquid discharge apparatus according to claim 1, wherein the retraction portion includes a bent portion between a lower end of the retraction portion and the rotation shaft, and the bent portion is bent toward an outside of the liquid discharge apparatus in the conveyance direction.

4. The liquid discharge apparatus according to claim 1, wherein the door is configured to swing toward an outside of the liquid discharge apparatus to be retracted upward.

5. The liquid discharge apparatus according to claim 1, wherein the door is configured to swing toward an inside of the liquid discharge apparatus to be retracted upward.

6. The liquid discharge apparatus according to claim 1, wherein the opening-and-closing cover has a front face extending in the vertical direction.

7. The liquid discharge apparatus according to claim 1, further comprising a contact roller between the retraction portion and the liquid discharge head in the conveyance direction and configured to contact a surface of the recording medium.

8. The liquid discharge apparatus according to claim 1, wherein the opening-and-closing cover includes:

a front cover configured to slide in a front direction in the conveyance direction; and a rear cover configured to slide in a rear direction opposite to the front direction to separate from the front cover, to open the opening-and-closing cover.

9. The liquid discharge apparatus according to claim 1, wherein the retraction portion includes an elastic deformation portion that is configured to elastically deform in an upward direction in the vertical direction.

10. A liquid discharge apparatus comprising:

a liquid discharge head configured to discharge a liquid to a recording medium;

a stage configured to move in a vertical direction to move the recording medium on the stage;

a guide rail configured to hold the stage, the stage being movable in a conveyance direction intersecting the vertical direction; and an opening-and-closing cover configured to slide in one of the conveyance direction and a main scanning direction intersecting both the conveyance direction and the vertical direction and including a retraction portion that is configured to retract above the stage, wherein the retraction portion includes a slide portion that is configured to slide in the vertical direction.

* * * * *